US009174415B2

(12) United States Patent
Gong et al.

(10) Patent No.: US 9,174,415 B2
(45) Date of Patent: Nov. 3, 2015

(54) COMPOSITE AND PREPARATION METHOD OF JOINING AMORPHOUS ALLOY MATERIAL TO HETEROGENEOUS MATERIAL

(75) Inventors: Qing Gong, Guangdong (CN); Faliang Zhang, Guangdong (CN); Yunchun Li, Guangdong (CN)

(73) Assignees: Shenzhen BYD Auto R&D Company Limited, Shenzhen (CN); BYD Company Limited, Shenzhen (CN)

( * ) Notice: Subject to any disclaimer, the term of this patent is extended or adjusted under 35 U.S.C. 154(b) by 0 days.

(21) Appl. No.: 14/238,817

(22) PCT Filed: Aug. 15, 2012

(86) PCT No.: PCT/CN2012/080190
§ 371 (c)(1),
(2), (4) Date: Feb. 13, 2014

(87) PCT Pub. No.: WO2013/023606
PCT Pub. Date: Feb. 21, 2013

(65) Prior Publication Data
US 2014/0199560 A1   Jul. 17, 2014

(30) Foreign Application Priority Data
Aug. 18, 2011 (CN) .......................... 2011 1 0237931

(51) Int. Cl.
*B22D 19/04* (2006.01)
*B32B 15/01* (2006.01)
(Continued)

(52) U.S. Cl.
CPC .............. *B32B 15/01* (2013.01); *B22D 19/04* (2013.01); *B22D 19/08* (2013.01); *C22C 45/00* (2013.01);
(Continued)

(58) Field of Classification Search
CPC .......... B22D 19/00; B22D 19/04; B22D 19/16
USPC ............................................... 164/91, 98–112
See application file for complete search history.

(56) References Cited

U.S. PATENT DOCUMENTS 3,921,701 A * 11/1975 Cordone .......................... 164/98
5,482,580 A    1/1996 Scruggs et al.
(Continued)

FOREIGN PATENT DOCUMENTS

CN    101829844    9/2010
CN    102152540    8/2011
(Continued)

OTHER PUBLICATIONS

International Search Report, International Application No. PCT/CN2012/080190, Nov. 22, 2012, 3 pages.
(Continued)

*Primary Examiner* — Kevin E Yoon
(74) *Attorney, Agent, or Firm* — Brinks Gilson & Lione

(57) ABSTRACT

A method of joining an amorphous alloy material to a heterogeneous material and a composite formed by the same are provided. The method comprises steps of: placing a pre-formed piece made of one of the amorphous alloy material and the heterogeneous material into a mold; heating the other of the amorphous alloy material and the heterogeneous material to a predetermined temperature, and casting the other of the amorphous alloy material and the heterogeneous material into the mold to form a transition connection part joining the amorphous alloy material to the heterogeneous material and having a fusion welded structure, a microstructure reinforcing connection structure and a composite connection structure; and cooling the amorphous alloy material and the heterogeneous material at a rate higher than a critical cooling rate of the amorphous alloy material to obtain a composite formed by joining the amorphous alloy material to the heterogeneous material by the transition connection part.

8 Claims, 10 Drawing Sheets

(51) Int. Cl.
*B22D 19/08* (2006.01)
*C22C 45/00* (2006.01)
*C22C 45/04* (2006.01)
*C22C 45/10* (2006.01)

(52) U.S. Cl.
CPC ............ *C22C 45/001* (2013.01); *C22C 45/008* (2013.01); *C22C 45/04* (2013.01); *C22C 45/10* (2013.01); *Y10T 428/12493* (2015.01)

(56) References Cited

U.S. PATENT DOCUMENTS

| | | | | |
|---|---|---|---|---|
| 5,896,911 | A * | 4/1999 | Gegel | 164/4.1 |
| 6,652,925 | B1 | 11/2003 | Schwarz et al. | |
| 6,771,490 | B2 | 8/2004 | Peker et al. | |
| 6,818,078 | B2 | 11/2004 | Kim et al. | |
| 2003/0024616 | A1 | 2/2003 | Kim et al. | |
| 2007/0111119 | A1 * | 5/2007 | Hu et al. | 430/57.8 |
| 2009/0239088 | A1 * | 9/2009 | Collier et al. | 428/469 |
| 2013/0040163 | A1 * | 2/2013 | Chiang et al. | 428/613 |

FOREIGN PATENT DOCUMENTS

| | | |
|---|---|---|
| JP | H07268597 A | 10/1995 |
| JP | 2009084613 A | 4/2009 |
| JP | 2009173964 A | 8/2009 |
| WO | WO 2012/065323 A1 | 5/2012 |

OTHER PUBLICATIONS

Bao, Jidong, "Research Development in Joining Amorphous Alloys," Gansu Science and Technology, Jan. 2010, vol. 26, No. 1, pp. 108-110.

* cited by examiner

COMPOSITE AND PREPARATION METHOD OF JOINING AMORPHOUS ALLOY MATERIAL TO HETEROGENEOUS MATERIAL

CROSS-REFERENCE TO RELATED APPLICATION

This application is the national phase application of PCT Application No. PCT/CN2012/080190, filed Aug. 15, 2012, which claims priority to and benefits of Chinese Patent Application Serial No. 201110237931.X, filed with the State Intellectual Property Office of P. R. China on Aug. 18, 2011, the entire content of both is incorporated herein by reference.

FIELD

The present disclosure relates to material engineering, and more particularly to a method of joining an amorphous alloy material to a heterogeneous material and a composite formed by the same.

BACKGROUND

The statements in this section merely provide background information related to the present disclosure and may or may not constitute prior art.

Currently, there are more and more needs for products with precision and durability, high reliability and high strength, however, conventional materials and conventional forming and joining technologies may hardly meet design requirements for products. For example, although a magnesium alloy has light weight and may be precisely formed, the magnesium alloy may be poor in strength and easy to crack, and may not be corrosion resistant. Although an aluminum alloy may be precisely formed and may have corrosion resistance and colorful decoration property, however, the aluminum alloy may be low in hardness and may not be wear resistant. Although a zinc alloy may be low in price and easy to form, the zinc alloy may be low in strength, and may not be corrosion resistant. Although a stainless steel may have high strength and high corrosion resistance, the stainless steel may be difficult to precisely form. Even if the stainless steel may be precisely machined, the machining cost is very high, so the stainless steel may be difficult to popularize.

Due to the unordered and uniquely arranged structure of atoms constituting an alloy, an amorphous alloy material, also referred to as metallic glass, may have excellent physical and chemical properties different from those of common crystalline metal materials, for example, high yield strength, high hardness, superelasticity (i.e., high elastic limit), high wear resistance, and high corrosion resistance, so may have broad application prospects.

An amorphous alloy has been first reported in 1960s. Because the critical size (i.e., the largest size to form an amorphous alloy) of the initial amorphous alloy only may reach micron scale, the initial amorphous alloy may be difficult to practically use. In recent years, gradual increase of the critical size of the amorphous alloy makes possible industrial application of the amorphous alloy.

The amorphous alloy has excellent casting performance. For example, the amorphous alloy has low melting temperature like a magnesium alloy, an aluminum alloy, a zinc alloy or a copper alloy, for example, the melting temperature of a rare-earth-based amorphous alloy may be as low as about 300° C. Because the amorphous alloy retains the structural feature of a molten state without phase change, the shrinkage rate of the amorphous alloy may be lower than that of a conventional metal and a plastic. Like a plastic, the amorphous alloy not only has a melting temperature and a glass transition temperature, but also has a large supercooled liquid phase region, so the amorphous alloy may have high flowability and good replicating of the shape and surface of a cast. Meanwhile, without performance difference caused by composition segregation and grain coarsening, the amorphous alloy in a casting state may have excellent mechanical property. The above advantages enable the amorphous alloy to have broad application prospects. For example, the use of an amorphous alloy material to manufacture a frame for an electronic device may solve problems of scratching, destruction under force, and other defects caused by insufficient hardness and strength in a frame made of a conventional metal material. The amorphous alloy material may also be used for manufacturing a structural member with very complex structure and high strength, which may solve large-cutting-amount machining problems created when a steel is used for manufacturing a precise structural member with complex structure and high strength. Meanwhile, the amorphous alloy material may be used for forming a precise micro-gear, which may solve problems of forming difficulty and poor wear resistance of the micro-gear.

However, due to some inherent characteristics of the amorphous alloy, the application of the amorphous alloy material is largely affected. For example, because the hardness of the amorphous alloy is high, when machining, punching and drilling need to be performed on an amorphous alloy article, the process difficulty may be increased, and the life of a cutting tool may be significantly shortened, thus enhancing the production cost. In addition, for an article with very complex structure and a wall thickness not larger than about 0.3 mm, the amorphous alloy article may be difficult to form, which may enhance the production cost to a large extent or even cause the production of the amorphous alloy article not to be carried out. Meanwhile, because the plastic deformation of the amorphous alloy is carried out by forming and extending a low-viscosity region of a shear band, the amorphous alloy generally exhibits very low plastic deformation and appears as a brittle material, which may largely restrict the application of the amorphous alloy in a device for which high safety is required, for example, the application of the amorphous alloy in an article for which drop performance or impact performance are specially required. Meanwhile, the use of various amorphous alloy systems, especially amorphous alloy materials with low amorphous formation ability and low cost, may be largely restricted. In addition, currently, an amorphous alloy is generally constituted by a noble metal, which may be high in material cost; and when the structure of an article is being designed, excellent performance of the amorphous alloy is not required for all the structures of articles. Therefore, how to realize low-cost application of a high-cost material is one difficult problem which needs to be solved.

U.S. Pat. Nos. 5,482,580; 6,818,078 and 6,771,490 disclose methods of joining an amorphous alloy material to other materials. However, in the amorphous alloy composite articles manufactured by these conventional methods, the bonding strength between the amorphous alloy material and other materials is low; the impact resistance of the amorphous alloy composite articles is low; and in the methods disclosed in the above U.S. Patents, it is required that the melting temperature of a pre-formed piece is higher than that of a material to be joined to the pre-formed piece, or the elastic limit of the amorphous alloy material is larger than about 1.5%. Therefore, the use of the amorphous alloy to be joined to other materials may be largely restricted.

Meanwhile, in terms of joining technique, buckling, nut, welding, bonding and other conventional techniques are widely used, which may cause low strength and poor reliability or cause high cost due to process complexity. Even if the insert molding technique is used, due to huge difference of heterogenic materials, the bonding strength is still poor.

SUMMARY

Embodiments of the present disclosure seek to solve at least one of the problems existing in the prior art to at least some extent. Accordingly, a method of joining an amorphous alloy material to a heterogeneous material is provided. By the method, high bonding strength and high reliability between the amorphous alloy material and the heterogeneous material may be ensured, a composite made of the amorphous alloy material and the heterogeneous material may have high impact toughness, and the method is simple in process and low in cost.

Further, a composite made of the amorphous alloy material and the heterogeneous material is also provided, which may have high strength, high impact toughness and high reliability. Therefore, the use requirements for the amorphous alloy material and the use amount of the amorphous alloy material may be reduced, the manufacturing process may be simplified, and the production cost may be reduced.

According to an aspect of the present disclosure, a method of joining an amorphous alloy material to a heterogeneous material is provided. The method comprises steps of:

placing a pre-formed piece made of one of the amorphous alloy material and the heterogeneous material into a mold;

heating the other of the amorphous alloy material and the heterogeneous material to a predetermined temperature, and then casting the other of the amorphous alloy material and the heterogeneous material into the mold to form a transition connection part joining the amorphous alloy material to the heterogeneous material and having one of a fusion welded structure, a microstructure reinforcing connection structure and a composite connection structure, in which the fusion welded structure is formed by the amorphous alloy material and the heterogeneous material via fusion welding, the microstructure reinforcing connection structure is formed by a microstructure on a surface of the pre-formed piece and the other of the amorphous alloy material and the heterogeneous material, and the composite connection structure comprises the fusion welded structure and the microstructure reinforcing connection structure; and cooling the amorphous alloy material and the heterogeneous material at a rate higher than a critical cooling rate of the amorphous alloy material to obtain a composite formed by the amorphous alloy material to the heterogeneous material joined via the transition connection part.

With the method of joining the amorphous alloy material to the heterogeneous material according to an embodiment of the present disclosure, the amorphous alloy material is joined to the heterogeneous material by a fusion welded structure, a microstructure reinforcing connection structure and a composite connection structure comprising the fusion welded structure and the microstructure reinforcing connection structure which are formed by the amorphous alloy material and the heterogeneous material, thus enhancing the bonding strength between the amorphous alloy material and the heterogeneous material, reducing the requirements for the forming ability and the performance of the amorphous alloy material, reducing the requirements for the elastic deformation of the amorphous alloy material, and enhancing the applicability of the amorphous alloy material.

According to another aspect of the present disclosure, a composite made of an amorphous alloy material and a heterogeneous material is provided. The composite comprises: a first part made of the amorphous alloy material; a second part made of the heterogeneous material; and a transition connection part joining the first part to the second part and having one of a fusion welded structure, a microstructure reinforcing connection structure and a composite connection structure, in which the fusion welded structure is formed by the amorphous alloy material and the heterogeneous material via fusion welding, the microstructure reinforcing connection structure is formed by a microstructure on a surface of a pre-formed piece made of one of the amorphous alloy material and the heterogeneous material and the other of the amorphous alloy material and the heterogeneous material, and the composite connection structure comprises the fusion welded structure and the microstructure reinforcing connection structure.

With the composite made of the amorphous alloy material and the heterogeneous material according to an embodiment of the present disclosure, the bonding strength between the amorphous alloy material and the heterogeneous material may be enhanced, the requirements for the forming ability and the performance of the amorphous alloy material may be reduced, the composite may be used for manufacturing an article with high manufacturing precision and complex structure, the use amount of the amorphous alloy material may be decreased, and the cost may be reduced.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
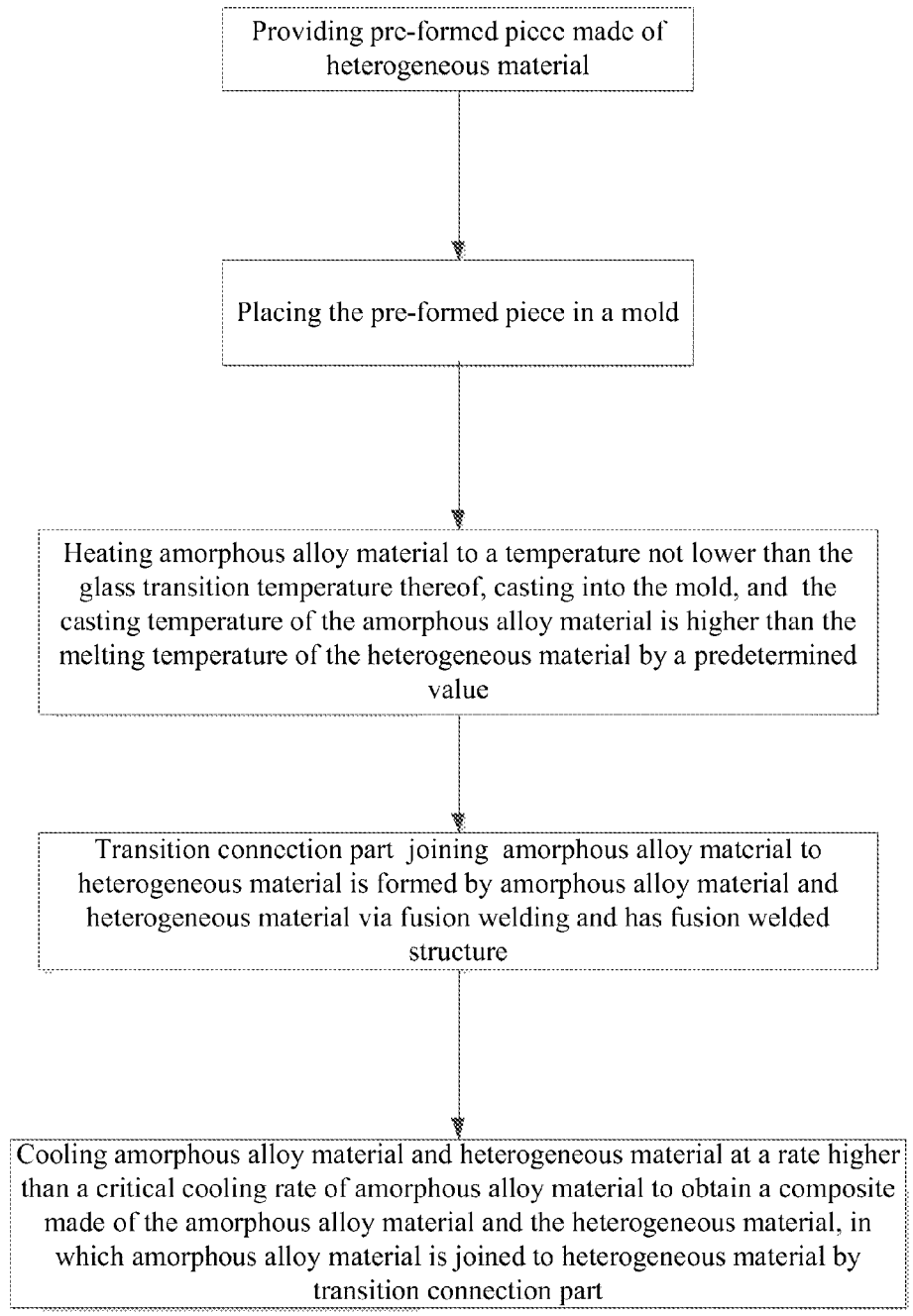
FIG. 1 is a flow chart of a method of joining an amorphous alloy material to a heterogeneous material according to a first embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the description, term "heterogeneous material" refers to a material which has characteristics (such as material characteristics and/or chemical property) obviously different from those of an amorphous alloy material to be joined to the heterogeneous material. It would be appreciated that the heterogeneous material may comprise an amorphous alloy material having a composition different from that of the amorphous alloy material to be joined to the heterogeneous material. In one embodiment, the heterogeneous material may be a heterogeneous metal material.

Figure 6:
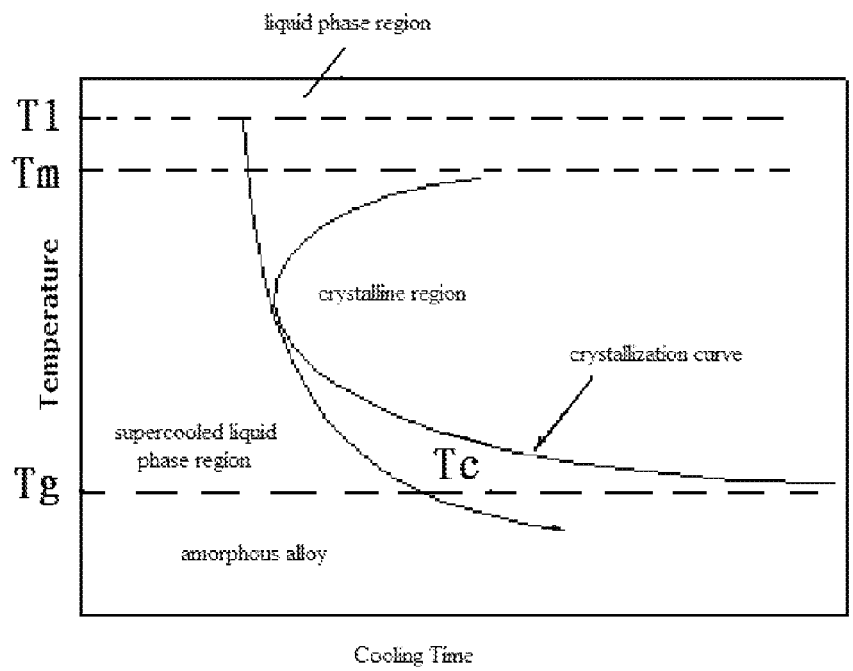
FIG. 6 is a time-temperature-transformation (TTT) diagram of an amorphous alloy material.
Figure 7:
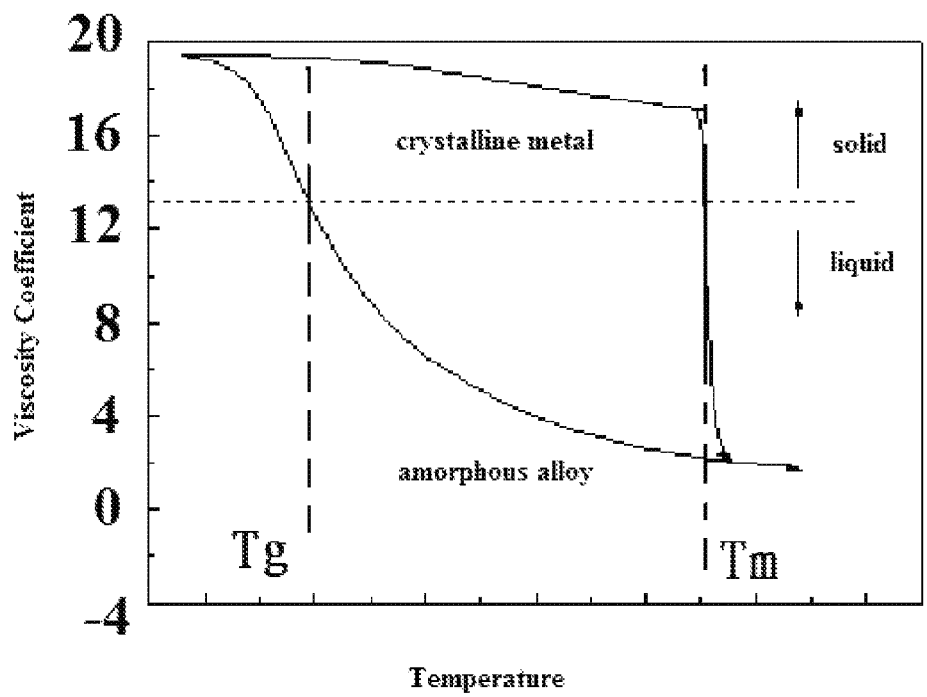
FIG. 7 is a curve diagram, which shows the change of the viscosity of a crystalline material and an amorphous alloy material with temperature.

As shown in FIG. 6, an amorphous alloy material, commonly referred to as a metallic glass, not only has a melting temperature $T_m$ like a conventional metal, but also has a glass transition temperature $T_g$. The difference between the melting temperature $T_m$ and the glass transition temperature $T_g$ of the amorphous alloy material may be up to about 400° C. or more. $T_1$ is a liquidus. $T_c$ is a critical cooling rate of the amorphous alloy material. It is known that the melt of the amorphous alloy material will be completely solidified only when the temperature of the melt of the amorphous alloy material reaches the glass transition temperature $T_g$ thereof, which is different from a conventional crystalline metal. Once the temperature of the melt of the conventional crystalline metal is lower than the melting temperature of the conventional crystalline metal, the melt of the conventional crystalline metal will be quickly solidified. Therefore, the amorphous alloy material may have broader temperature range, which may facilitate flow molding. The change of the viscosity of an amorphous alloy material and a conventional crystalline metal material with temperature is shown in FIG. 7. Meanwhile, without nucleation and crystallization, there are no grains in the amorphous alloy material, so intermetallic compounds will not be formed. Therefore, in a melt state or even at a temperature approaching the glass transition temperature $T_g$ of the amorphous alloy material, the amorphous alloy material may be present in an atom state, and atoms in the amorphous alloy material may move freely, so the melt of the amorphous alloy material may have strong replication ability, even may replicate atomic-level structural features, as described in literature "Nanomoulding with amorphous metals, Nature, Vol. 457, 868-872".

The inventors may achieve high bonding strength and high reliability between the amorphous alloy material and the heterogeneous material by combining respective characteristics of the amorphous alloy material and the heterogeneous material.

Figure 9:
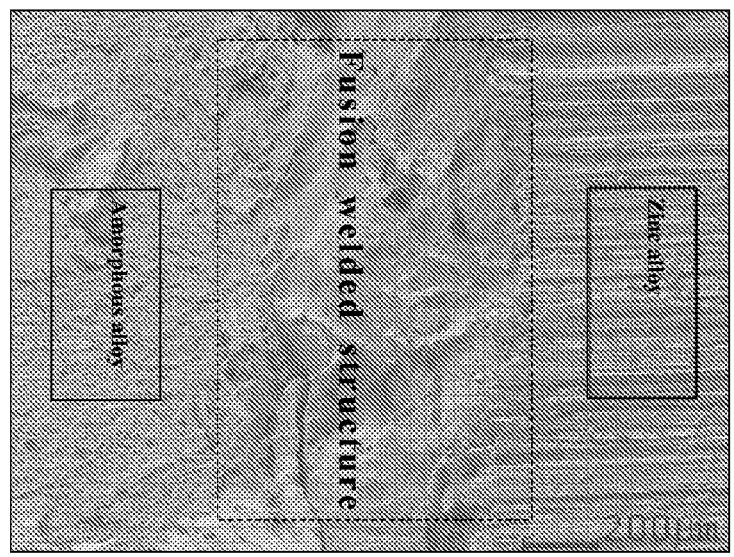
FIG. 9 is a metallograph of a fusion welded structure of a transition connection part of a composite formed by a zinc alloy and an amorphous alloy material via fusion welding according to an embodiment of the present disclosure.

It has been found by the inventors that a fusion welded region (i.e., a transition connection part) may be formed by the amorphous alloy material and a conventional metal material. The fusion welded region has a structural feature of gradual transition from an amorphous state to a crystalline state, and the bonding force is present in the form of a metallic bond, so the fusion welded region may have high structural strength. Meanwhile, because the fusion welded region has a structural feature of gradual transition, the fusion welded region may have continuously gradually changed thermal expansion coefficient and heat capacity, so the fusion welded region may have high thermal stability and high anti-structural-deformation ability, as shown in FIG. 9. FIG. 9 shows an electron microscopic morphology of a fusion welded structure after fusion welding a zinc alloy and an amorphous alloy material. The fusion reaction between an amorphous alloy material with large critical size and other metal elements is accompanied by gradual reduction of the critical size and gradual change of material characteristics, thus achieving gradual transition from an amorphous state to a crystalline state. This gradually changed structure is one of requirements to obtain high welding strength.

In the description herein, a bulk amorphous alloy material may refers to an amorphous alloy material with a critical size larger than about 1 mm and a critical cooling rate lower than about 500° C./s.

Figure 10:
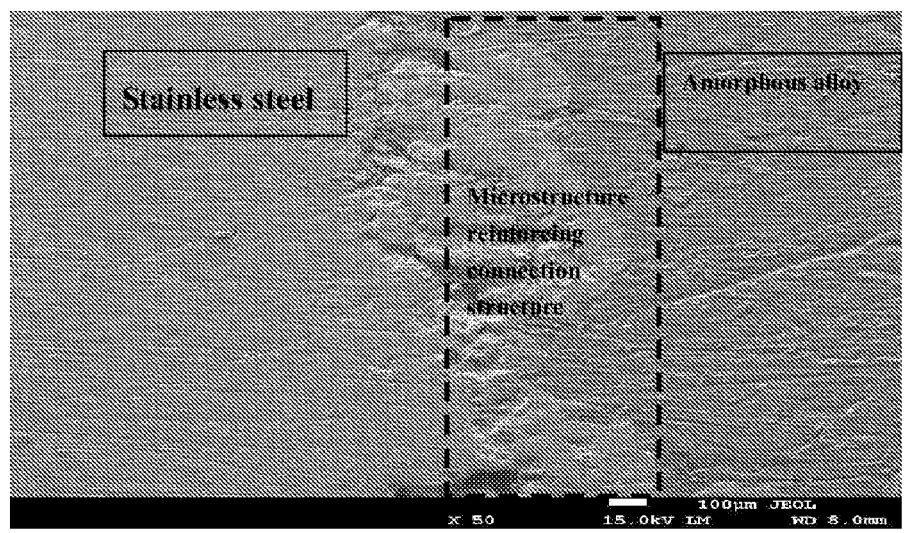
FIG. 10 is a metallograph of a microstructure reinforcing connection structure of a transition connection part of a composite made of a stainless steel and an amorphous alloy material according to an embodiment of the present disclosure.
Figure 11:
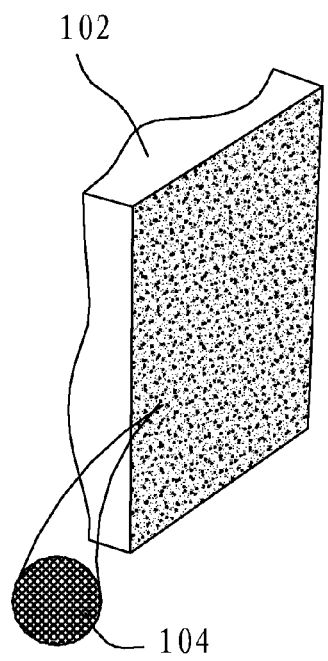
FIG. 11 is a schematic perspective view of a pre-formed piece formed with a microstructure according to an embodiment of the present disclosure.

Because the amorphous alloy material has excellent flowability and strong replication ability, it has been further found by the inventors that the amorphous alloy material may be closely connected with a pre-formed piece made of the heterogeneous material, especially a pre-formed piece with large specific surface or a pre-formed piece having a microstructure, with increased connection area, which may increase the molecular force (e.g., van der Waals force) and produce strong mechanical force by the microstructure of the pre-formed piece so as to achieve reliable bonding strength. In some embodiments, the microstructure on a surface of the pre-formed piece may be shown in FIG. 11, and the transition connection part between the pre-formed piece and the amorphous alloy material is shown in FIG. 10. As shown in FIG. 10, the joining of the amorphous alloy material and a stainless steel pre-formed piece formed with a microstructure is described as an example for illustration purpose.

It has been found by the inventors through research that, if the pre-formed piece is made of a heterogeneous metal material and a casting temperature of the melt of the amorphous alloy material is higher than a melting temperature of the heterogeneous metal material by a predetermined value, for example, the predetermined value is not less than about 15% of the melting temperature of the heterogeneous metal material, when the melt of the amorphous alloy material enters into a chamber of a mold and contacts with the heterogeneous metal material, the surface of the heterogeneous metal material will be softened or melted by the melt of the amorphous alloy material, and the amorphous alloy material and the heterogeneous metal material will be subjected to fusion melting. In the description, the term "casting temperature" refers to a temperature at which a melt of a material contacting with a wall of a chamber of a mold or another material in the chamber of the mold after the melt of the material enters into the chamber of the mold. It should be noted that in practical use, because the structure of an article to be manufactured is complex, when the melt of the amorphous alloy material enters into the mold, the temperature distribution of the melt of the amorphous alloy material is nonuniform, so that the temperatures at which the melt of the amorphous alloy material contacts with the pre-formed piece is different. Therefore, mold flow analysis or other temperature tests may be performed according to the structure of the article, the initial temperature of the melt of the amorphous alloy material, and the temperature distribution of the melt of the amorphous alloy material in the mold, to analyze the temperature distribution of the melt of the amorphous alloy material in the mold, so as to determine the casting temperature in each region of the mold or at each point of the mold. According to the welding theory, when a welding member and a member to be welded are both in a molten state and the chemical reaction between the welding member and the member to be welded take place, a fusion welded structure will be formed. The welding member needs latent heat of fusion during the melting process, and consequently may need enough energy. It has been found by the inventors through research that, because the amorphous alloy material has high chemical activity, when the temperature of the melt of the amorphous alloy material is higher than the melting temperature of the heterogeneous metal material by a predetermined value, the amorphous alloy material will supply latent heat of fusion to the heterogeneous metal material and chemically reacts with the heterogeneous metal material to form a stable fusion welded structure. In addition, the amorphous alloy material does not have a fixed melting point, and the amorphous alloy material will be softened and viscous flow will occur at a temperature higher than a glass transition temperature of the amorphous alloy material. Therefore, if the pre-formed piece made of the amorphous alloy material is placed into the mold, it has been found by the inventors through research that, when a casting temperature of the heterogeneous metal material is higher than a glass transition temperature of the amorphous alloy material by a predetermined value, for example, the predetermined value is not less than about 15% of the glass transition temperature of the amorphous alloy material, when the melt of the heterogeneous metal material enters into a chamber of a mold and contacts with the amorphous alloy material, the amorphous alloy material and the heterogeneous metal material will be subjected to fusion melting, and the chemical reaction between the amorphous alloy material and the heterogeneous metal material will take place so as to form a stable fusion melted structure.

When the structure of the article is more complex, the temperature distribution of a melt is nonuniform. If a microstructure is formed on a surface of the pre-formed piece, a fusion welded structure and a microstructure reinforcing connection structure will be formed between the amorphous alloy material and the heterogeneous material, thus further achieving high bonding strength.

It has been found by the inventors through research that achieving high bonding strength may give full play to unique properties of the amorphous alloy material and the heterogeneous material. For example, the amorphous alloy material has properties of high strength, high hardness and high brittleness, while the heterogeneous material has properties of low strength, high toughness and high plasticity. Therefore, when an external force is applied to a composite made of the amorphous alloy material and the heterogeneous material, the heterogeneous material will absorb the deformation energy, so that the composite may exhibit good impact resistance and high drop performance; because the amorphous alloy material has excellent elastic deformation property, the composite may not be deformed significantly. Even if a larger external force is applied to the composite and the amorphous alloy material cracks or breaks, because of high plastic deformation of the heterogeneous material and reliable bonding strength between the amorphous alloy material and the heterogeneous material, the breakage of and the damage to the composite, which may result in serious structural damage, may be avoided, thus achieving high reliability of the composite. Because the cost of a conventional material is usually lower than that of the amorphous alloy material, by reliable connection, the application cost of the amorphous alloy material may be reduced significantly while ensuring that a structural member with high performance is obtained.

In some embodiments, in consideration of practical production and application features of the amorphous alloy material, advantageously, the amorphous alloy material may be a bulk amorphous alloy material. In the description herein, the bulk amorphous alloy material may refers to an amorphous alloy material with a critical size larger than about 1 mm.

The method of joining the amorphous alloy material to the heterogeneous material and the composite formed by joining the amorphous alloy material to the heterogeneous material by the method according to an embodiment of the present disclosure will be described below with reference to the drawings.

Figure 8:
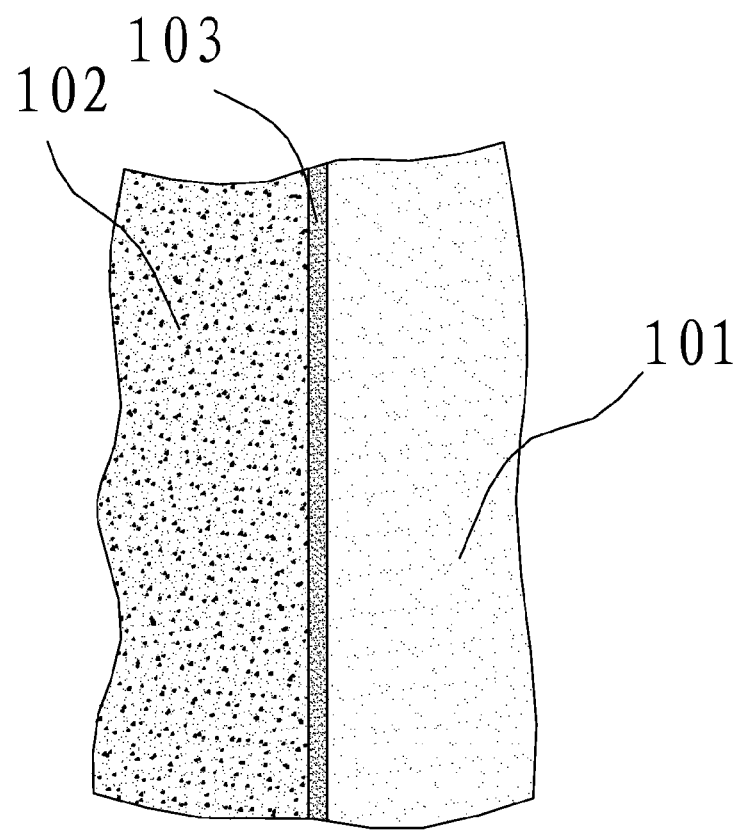
FIG. 8 is a schematic view of a composite according to an embodiment of the present disclosure.

FIG. 8 is a schematic view of a composite made of an amorphous alloy material and a heterogeneous material according to an embodiment of the present disclosure. As shown in FIG. 8, the composite comprises: a first part 101 made of the amorphous alloy material; a second part 102 made of the heterogeneous material; and a transition connection part 103 between the first part 101 and the second part 102. In one embodiment, the transition connection part 103 has a fusion welded structure formed by the first part 101 and the second part 102 via fusion welding. In an alternative embodiment, the transition connection part 103 has a fusion welded structure formed by the first part 101 and the second part 102 via fusion welding, and a microstructure reinforcing connection structure formed by a microstructure on a surface of one of the first part 101 and the second part 102, that is, the transition connection part 103 has a composite connection structure. In another alternative embodiment, the transition connection part 103 has a microstructure reinforcing connection structure formed by a microstructure on a surface of one of the first part 101 and the second part 102.

It should be noted that the transition connection part 103 described herein means a transitional portion or area between the first part 101 and the second part 102, which should not be confined to a specific dimension or configuration. That is, the transition connection part 103 is a part composed of the amorphous alloy material and the non-amorphous material which are crossed, cross-linked, welded or joined at the interface therebetween.

In the process of joining the amorphous alloy material to the heterogeneous material, depending on different materials of the pre-formed piece, the joining processes are different.

The method of joining the amorphous alloy material to the heterogeneous material according to a first embodiment of the present disclosure will be described below with reference to FIG. 1.

As shown in FIG. 1, first, a pre-formed piece made of the heterogeneous material is provided and placed into a mold. Advantageously, the heterogeneous material may be a heterogeneous metal material. Then, the amorphous alloy material is heated to a temperature not lower than a glass transition temperature of the amorphous alloy material, for example, a temperature not lower than a melting temperature of the amorphous alloy material, and cast into the mold to form a transition connection part joining the amorphous alloy material to the heterogeneous material. Finally, the mold are cooled at a rate higher than a critical cooling rate of the amorphous alloy material to obtain a composite made of the amorphous alloy material and the heterogeneous material, in which the amorphous alloy material is joined to the heterogeneous material by the transition connection part.

In some embodiments, a casting temperature of the amorphous alloy material is higher than a melting temperature of the heterogeneous material by a predetermined value, for example, the predetermined value is not less than about 15% of the melting temperature of the heterogeneous material. As described above, because the casting temperature of the amorphous alloy material is higher than the melting temperature of the heterogeneous material by a predetermined value, the transition connection part formed by the amorphous alloy material and the heterogeneous material via fusion welding has a fusion welded structure.

As shown in FIG. 9, the heterogeneous material may be a zinc alloy, and the transition connection part having a fusion welded structure is shown.

In this embodiment, the pre-formed piece made of the heterogeneous material is joined to the amorphous alloy material by the transition connection part, and the transition connection part has a fusion welded structure, thus enhancing the bonding strength between the amorphous alloy material and the heterogeneous material and reducing the requirements for the forming ability and the performance of the amorphous alloy material largely. Advantageously, the amorphous alloy material is a bulk amorphous alloy material with a critical size larger than about 1 mm. Meanwhile, because high bonding strength between the amorphous alloy material and the heterogeneous material is achieved, the elastic limit of the amorphous alloy material may be reduced to about 0.5%. However, in U.S. Pat. No. 6,771,490, it is required that the amorphous alloy material has an elastic limit of about 1.5% to ensure the safety of an article structure. Because the requirement for the performance of the amorphous alloy material is reduced, the amorphous alloy material may be a bulk amorphous alloy material, which has a crystalline phase produced during the casting process because of small critical size or is doped with inorganic substances. It has been found by the inventors through research that, as long as it is ensured that the amorphous alloy material has an elastic limit of about 0.5% or more in practical use, the application requirements may be met.

In some embodiments, during the cooling process, the fusion welded structure may have one of an amorphous structure, a crystalline structure, and any combination thereof.

More advantageously, the amorphous alloy material contains crystalline substances or is doped with inorganic substances. In some embodiments, the amorphous alloy material may be at least one material selected from a group consisting of a Fe-based amorphous alloy, a Zr-based amorphous alloy, a Cu-based amorphous alloy, a Ti-based amorphous alloy, and a Ni-based amorphous alloy.

Advantageously, the matrix elements or the major elements of the heterogeneous material may be similar to the major elements of the amorphous alloy material so as to achieve better welding effect, thus achieving higher bonding strength.

In the practical article application process, the amorphous alloy material may be flexibly selected according to practical requirements. In consideration of factors of the cost and the comprehensive performance, advantageously, the amorphous alloy material may be at least one material selected from a group consisting of a Fe-based amorphous alloy, a Zr-based amorphous alloy, a Cu-based amorphous alloy, a Ti-based amorphous alloy, and a Ni-based amorphous alloy. According to the current situation of the research on the amorphous alloy material and the requirement for the performance of the amorphous alloy material, advantageously, the amorphous alloy material may be represented by at least one of the following general formulas:

$Zr_{a1}Al_{b1}Cu_{c1}Ni_{d1}Y_{e1}$, in which $40 \leq a1 \leq 70$; $5 \leq b1 \leq 35$; $5 \leq c1 \leq 40$; $5 \leq d1 \leq 14$; $0 \leq e1 \leq 5$; a1, b1, c1, d1 and e1 are each atomic percents; and the amorphous alloy may contain about 5 atomic percents or less of other elements or impurity elements;

$Zr_{a2}Al_{b2}Cu_{c2}(M1)_{d2}$, in which $30 \leq a2 \leq 70$; $5 \leq b2 \leq 35$; $5 \leq c2 \leq 40$; $5 \leq d2 \leq 30$; M1 is at least one element selected from the group consisting of Nb, Sc, Ta, Ni, Co, Y, Ag, Fe, Sn, Hf, Ti and Be; a2, b2, c2 and d2 are each atomic percents; and the amorphous alloy may contain about 5 atomic percents or less of other elements or impurity elements;

$(Zr,Ti)_{a3}(Cu,Ni)_{b3}Be_{c3}(M2)_{d3}$, in which $40 \leq a3 \leq 60$; $15 \leq b3 \leq 35$; $0 \leq c3 \leq 25$; $5 \leq d3 \leq 30$; M2 is at least one element selected from the group consisting of Nb, Sc, Ta, Y, Ag, Fe, Sn, Al, Hf and rare earth elements; a3, b3, c3 and d3 are each atomic percents; and the amorphous alloy may contain about 5 atomic percents or less of other elements or impurity elements;

$Ti_{a4}Cu_{b4}(M3)_{c4}(M4)_{d4}$, in which M3 is at least one element selected from the group consisting of Ni, Fe, Co, Mn, Ru, Ag, Pd, Pt and Sn; M4 is at least one element selected from the group consisting of Al, Be, Y and Sc; a4, b4, c4 and d4 are each atomic percents; $40 \leq a4 \leq 55$; $25 \leq b4 \leq 45$; $0 \leq c4 \leq 4$; $1 \leq d4 \leq 7$; and the sum of a4, b4, c4 and d4 is 100;

$Fe_{a5}Cr_{b5}Mo_{c5}(M5)_{d5}B_{e5}Y_{f5}$, in which $40 \leq a5 \leq 70$; $0 < b5 \leq 20$; $0 < c5 \leq 20$; $0 < d5 \leq 10$; $0 < e5 \leq 30$; $0 < f5 \leq 10$; a5, b5, c5, d5, e5 and f5 are each atomic percents; the sum of a5, b5, c5, d5, e5 and f5 is 100; and M5 is at least one element selected from the group consisting of Zr, Al, Ti, Mn, W, Co, C, Si, Nd and Hf;

$Ni_{a6}Zr_{b6}(M6)_{c6}$, in which $40 \leq a6 \leq 60$, $10 \leq b6 \leq 30$, $5 \leq c6 \leq 25$, a6, b6 and c6 are each atomic percents; the sum of a6, b6 and c6 is 100; and M6 is at least one element selected from the group consisting of Nb, Ti, Co, Cu, Al, Hf, Si and rare earth elements; and $Cu_{(100-a7-b7-c7-d7)}Zr_{a7}Al_{b7}(M7)_{c7}(M8)_{d7}$, in which $36 \leq a7 \leq 49$; $1 \leq b7 \leq 10$; $0 \leq c7 \leq 10$; $0 \leq d7 \leq 5$; a7, b7, c7 and d7 are each atomic percents; M7 is at least one element selected from the group consisting of Nb, Ti, Be, Ag and Y; M8 is at least one element selected from the group consisting of amphoteric elements, Sn and Si; and the amorphous alloy may contain about 5 atomic percents or less of other elements or impurity elements.

In addition, other amorphous alloy materials, for example, the bulk amorphous alloys disclosed in U.S. Pat. Nos. 5,288, 344; 5,368,659; 5,618,359; 6,682,611; 5,735,975, may also be used in the present disclosure.

In some embodiments, the heterogeneous material may be a heterogeneous metal material; and the heterogeneous metal material may be selected from a group consisting of a steel, an aluminum alloy, a magnesium alloy, a nickel alloy, a copper alloy, a titanium alloy, a zinc alloy, a heterogeneous bulk amorphous alloy, and any combination thereof.

In practical production and application, in consideration of complementary advantages of the amorphous alloy material and the heterogeneous material, advantageously, the pre-formed piece made of the heterogeneous material may be a workpiece with a certain structural feature, for example, a structural piece such as at least one of a sheet, a shaft, a frame, a nut, and a buckle. Advantageously, the sheet has a thickness less than about 0.3 mm.

It should be noted that, when the transition connection part 103 has a fusion welded structure (as shown in FIG. 9) or a composite connection structure, the heterogeneous material may be a heterogeneous metal material; and when the transition connection part 103 has a microstructure reinforcing connection structure (as shown in FIG. 10), the heterogeneous material may also be a nonmetal material, for example, glass or a plastic material.

Because the amorphous alloy material has good casting performance and the nature of glass, advantageously, the casting step is performed by die casting, gravity casting or squeeze casting. Meanwhile, because the amorphous alloy material in a high-temperature state or a molten state has high chemical activity and the critical feature of the amorphous alloy material may be easily affected by nonmetal impurity elements, advantageously, the casting step is performed under vacuum or inert gas protection.

The method of joining the amorphous alloy material to the heterogeneous material according to a second embodiment of the present disclosure will be described below with reference to FIG. 2.

Figure 2:
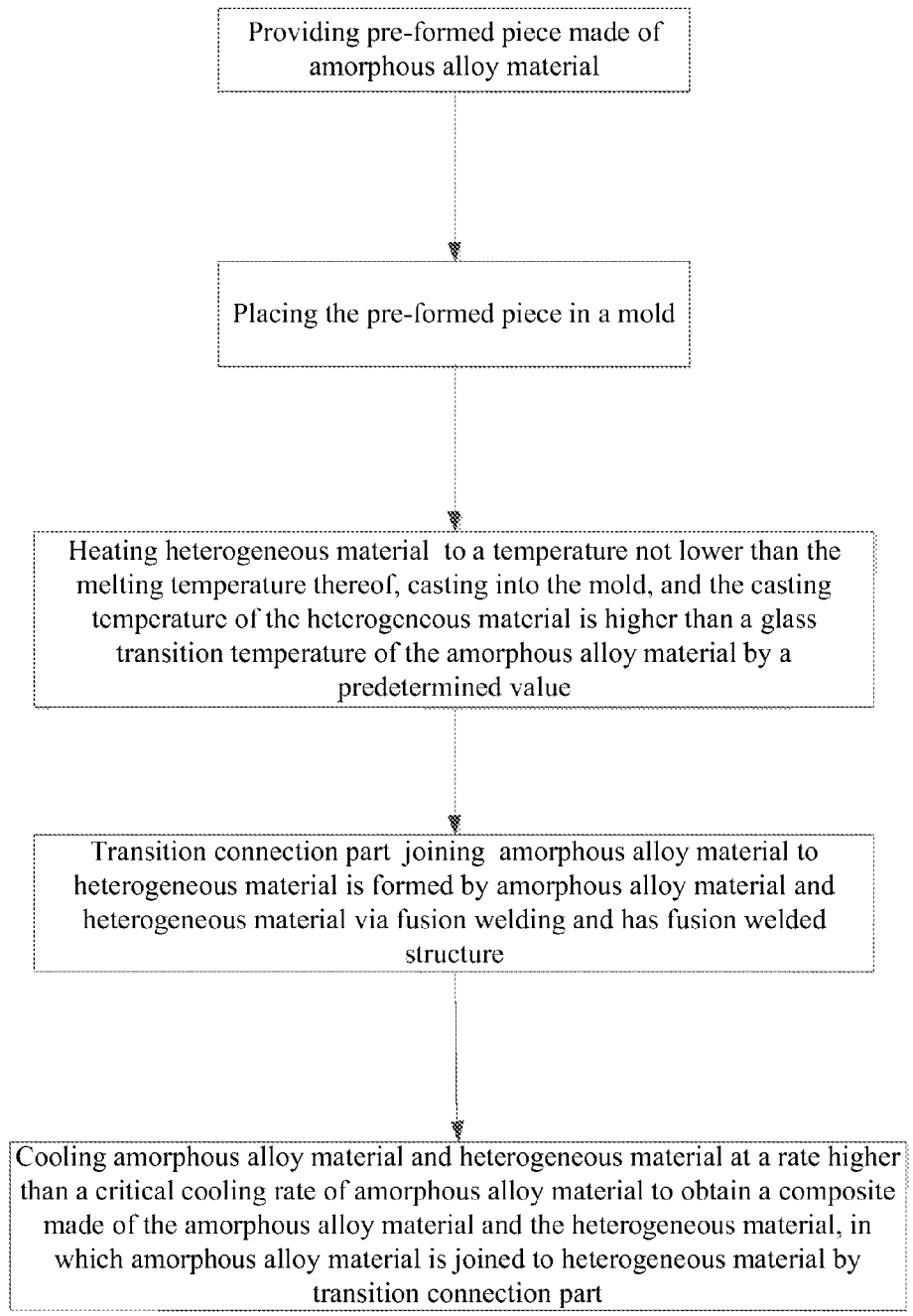
FIG. 2 is a flow chart of a method of joining an amorphous alloy material to a heterogeneous material according to a second embodiment of the present disclosure.

As shown in FIG. 2, first, a pre-formed piece made of the amorphous alloy material is provided and placed in a mold. Then, the heterogeneous material is heated to a temperature not lower than a melting temperature of the heterogeneous material, and cast into the mold to form a transition connection part joining the amorphous alloy material to the heterogeneous material. Advantageously, the heterogeneous material may be a heterogeneous metal material. Finally, the mold are cooled at a rate higher than a critical cooling rate of the amorphous alloy material to obtain a composite formed by joining the amorphous alloy material to the heterogeneous material by the transition connection part.

In some embodiments, a casting temperature of the heterogeneous material is higher than a glass transition temperature of the amorphous alloy material by a predetermined value, for example, the predetermined value is not less than about 15% of the glass transition temperature of the amorphous alloy material. As described above, because the casting temperature of the heterogeneous material is higher than the glass transition temperature of the amorphous alloy material by a predetermined value, the transition connection part is formed by the amorphous alloy material and the heterogeneous material via fusion welding. Advantageously, the casting temperature of the heterogeneous material is higher than a melting temperature of the amorphous alloy material.

Other aspects of the method of joining the amorphous alloy material to the heterogeneous material according to the second embodiment of the present disclosure are the same as those of the method of joining the amorphous alloy material to the heterogeneous material according to the first embodiment of the present disclosure, so a detailed description thereof will be omitted here.

The method of joining the amorphous alloy material to the heterogeneous material according to a third embodiment of the present disclosure will be described below with reference to FIG. 3.

Figure 3:
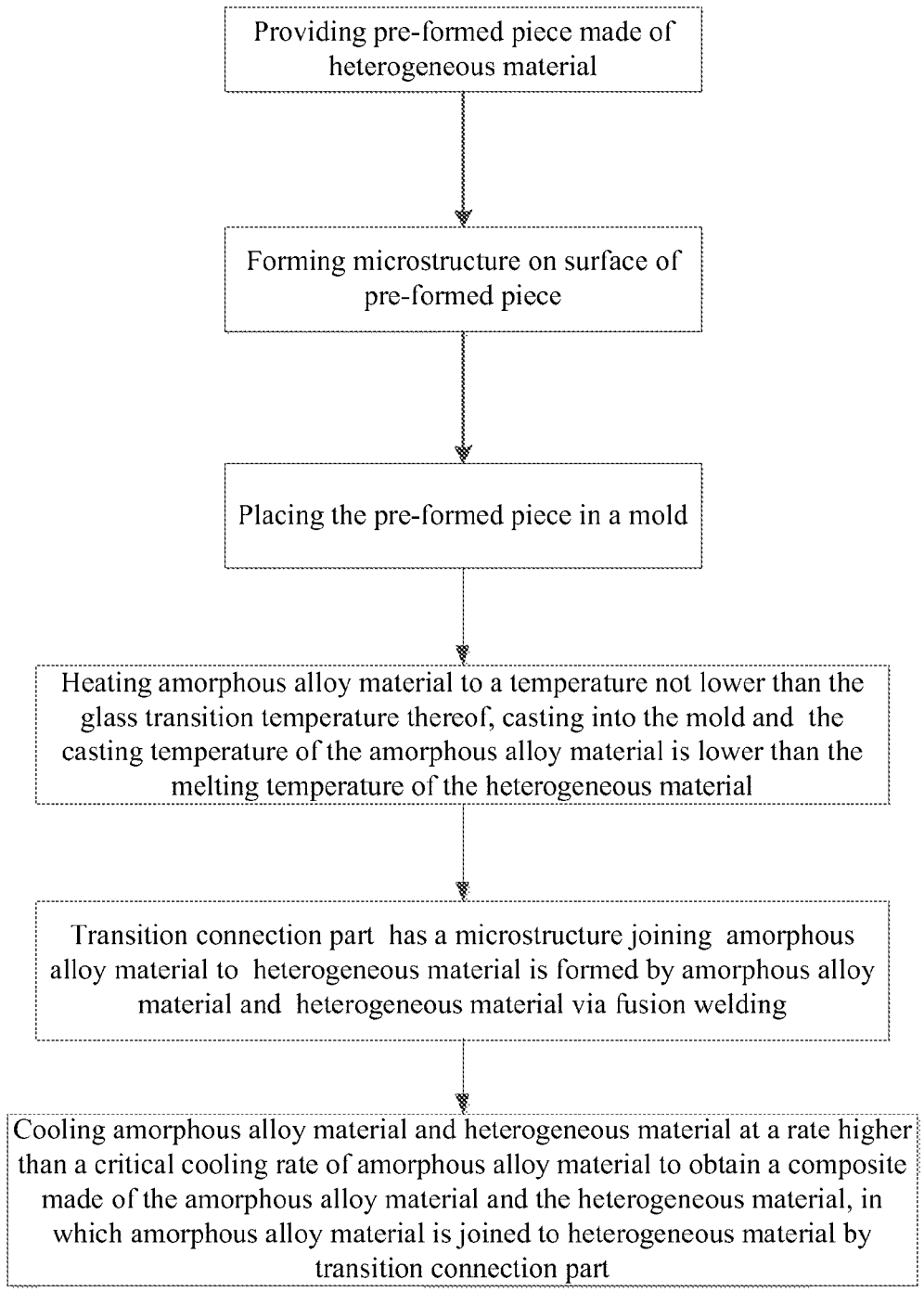
FIG. 3 is a flow chart of a method of joining an amorphous alloy material to a heterogeneous material according to a third embodiment of the present disclosure.
Figure 4:
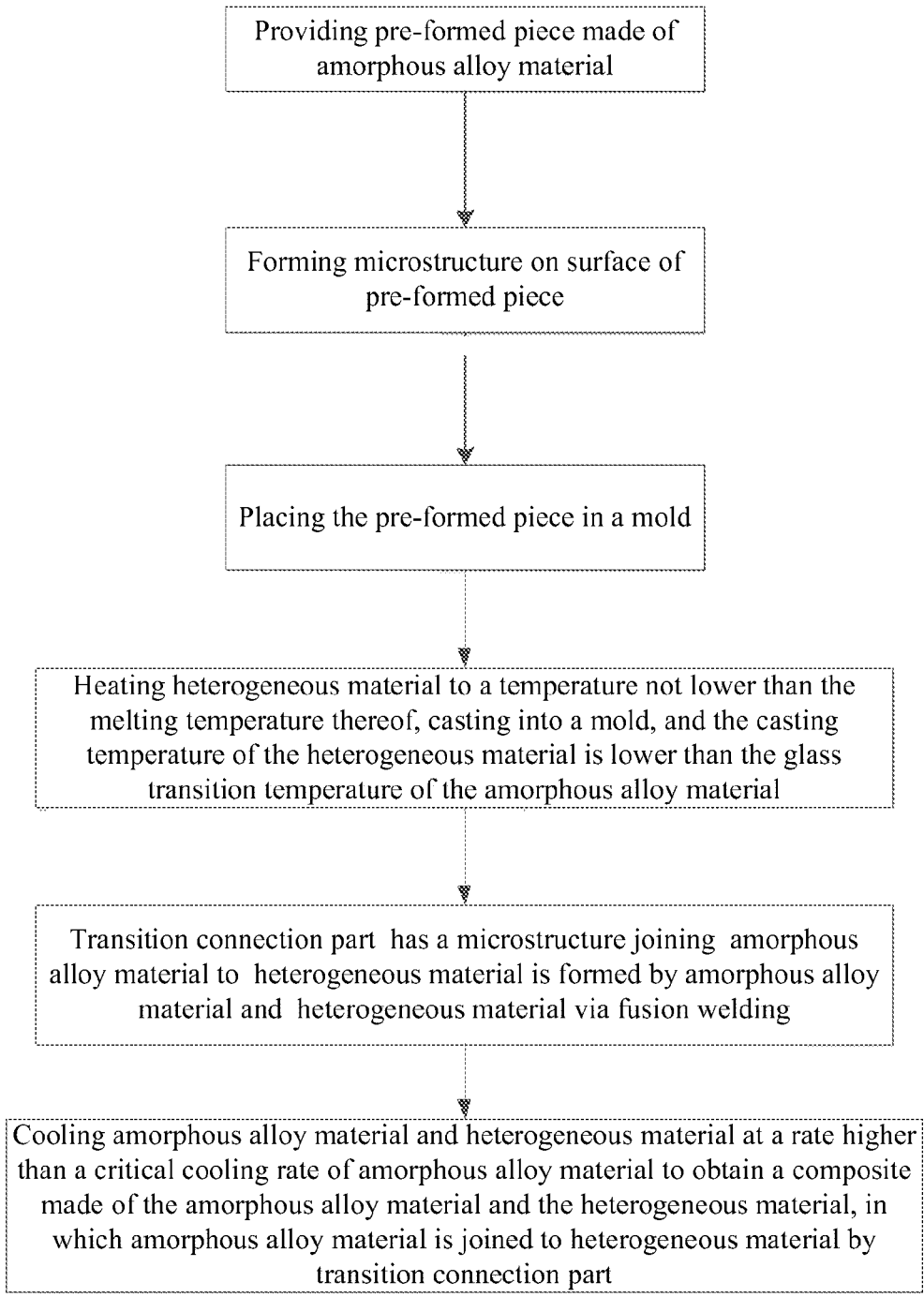
FIG. 4 is a flow chart of a method of joining an amorphous alloy material to a heterogeneous material according to a fourth embodiment of the present disclosure.

As shown in FIG. 3, first, a pre-formed piece made of the heterogeneous material is provided, and a microstructure is formed on a surface of the pre-formed piece. As shown in FIG. 4, a microstructure 104 is formed on the surface of the pre-formed piece, for example, formed on at least a portion of the surface of the pre-formed piece joined to the amorphous alloy material. The pre-formed piece is placed in a mold. Then, the amorphous alloy material is heated to a temperature not lower than a glass transition temperature of the amorphous alloy material, advantageously, a temperature not lower than a melting temperature of the amorphous alloy material, and cast into the mold to form a transition connection part joining the amorphous alloy material to the heterogeneous material. Finally, the mold are cooled at a rate higher than a critical cooling rate of the amorphous alloy material to obtain a composite made of the amorphous alloy material and the heterogeneous material.

In some embodiments, a casting temperature of the amorphous alloy material is lower than a melting temperature of the heterogeneous material, so that the transition connection part between the amorphous alloy material and the heterogeneous material has a microstructure reinforcing connection structure formed by the amorphous alloy material and the microstructure on the surface of the pre-formed piece. By forming the microstructure reinforcing connection structure, the bonding strength between the amorphous alloy material and the heterogeneous material may be enhanced.

Because the casting temperature of the amorphous alloy material is lower than the melting temperature of the heterogeneous material, the melt of the amorphous alloy material may not destroy the microstructure on the surface of the pre-formed piece, so that the microstructure reinforcing connection structure may be formed by the amorphous alloy material and the microstructure on the surface of the pre-formed piece to enhance the bonding strength between the amorphous alloy material and the heterogeneous material.

In consideration of the influence of excellent casting performance and strong replication characteristics of the amorphous alloy material on the microstructure reinforcing connection structure, it has been found by the inventors through research that, advantageously, the microstructure on the surface of the pre-formed piece is at least one of a hole, a closed or semi-closed honeycomb structure, and a surface structure with a roughness Ra between about 1 µm and about 250 µm, thus achieving excellent bonding strength. Advantageously, the minimum three-dimensional feature size of the hole and/or the honeycomb structure ranges from about 1 µm to about 3000 µm.

In consideration of the economical efficiency of the production, in some embodiments, advantageously, the microstructure may be formed by at least one of shot blasting, sand blasting, machining, chemical corrosion, laser machining, foaming, and molding.

It should be noted that, the term "feature size" should be understood in a broad sense. For example, when the microstructure is a hole, the feature size may refer to the diameter of the hole; and when the microstructure is a honeycomb structure, the feature size may refer to the diameter of a hole of the honeycomb structure.

In this embodiment, because the transition connection part between the amorphous alloy material and the heterogeneous material has a microstructure reinforcing connection structure, the heterogeneous material may be a material with a high melting temperature or a material with a low melting temperature, and may also be an amorphous alloy having characteristics different from those of an amorphous alloy material to be joined to the heterogeneous material. It has been found by the inventors through research that, advantageously, the heterogeneous material is selected from a group consisting of a steel, an aluminum alloy, a magnesium alloy, a nickel alloy, a copper alloy, a titanium alloy, a zinc alloy, a plastic material, ceramics, glass, a heterogeneous bulk amorphous alloy, and any combination thereof.

When the heterogeneous material is ceramics or glass, because the heterogeneous material needs to sustain high thermal shock during the casting process, advantageously, the heterogeneous material has low thermal expansion coefficient to resist the change of the temperature. It has been found by the inventors through research that, advantageously, the ceramics is selected from the group consisting of aluminum oxide ceramics, zirconium oxide ceramics, silicon nitride ceramics, boron carbide ceramics, silicon carbide ceramics, and any combination thereof, each of which has low thermal expansion coefficient; and advantageously, the glass is selected from the group consisting of glass ceramics and quartz glass, each of which has low thermal expansion coefficient.

When the heterogeneous material is a plastic material, advantageously, the plastic material is selected from a group consisting of polyethylene (PE), polyvinyl chloride, polystyrene, polyvinyl alcohol, polypropylene, polybutylene, polyisobutylene, polyformaldehyde, polyamide, polycarbonate, polytetrafluoroethylene, polyethylene terephthalate, an epoxy resin, phenolic resin, polyurethane, and a rubber.

In some embodiments, because the heterogeneous material may be a nonmetal heterogeneous material, the casting step may be performed by die casting, gravity casting or injection molding. When the heterogeneous material is a plastic material, advantageously, the casting step may be performed by injection molding.

It should be noted that, in some embodiments, the casting process is not limited to the above casting processes. For example, the casting process may be permanent molding, die casting, hot pressing or a continuous process such as planar flow casting. One such die-casting process is disclosed in U.S. Pat. No. 5,711,363, which is incorporated by reference. Other casting processes are disclosed in, for example, U.S. Pat. Nos. 6,027,586; 5,950,704; 5,896,642; 5,324,368; 5,306,463, each of which is incorporated by reference in its entirety. In some embodiments, because the amorphous alloy material has high strength and metastable structural characteristics, the obtained composite made of the amorphous alloy material and the heterogeneous material may not need to be subjected to heat treatment.

In the following, only the processes of die casting and hot pressing for joining the amorphous alloy material to the heterogeneous material will be described in detail.

Die Casting

The pre-formed piece made of the heterogeneous material and formed with a microstructure on a surface thereof is placed in a die-casting mold and fixed onto the die-casting mold. Then, the amorphous alloy material may be heated to the glass transition temperature to form a melt or a semisolid melt of the amorphous alloy material, which is cast into a casting chamber of the die-casting mold to perform die casting. A casting temperature of the amorphous alloy material is lower than a melting temperature of the heterogeneous material. In the die casting process, the temperature of the melt of the amorphous alloy material is higher than the melting temperature of the amorphous alloy material to facilitate the feeding operation. The entire die casting process only lasts for tens of seconds or less, for example, ten seconds or less if hot chamber die casting is used, thus increasing the yield dramatically. Due to the excellent flowability of the molten amorphous alloy material, the amorphous alloy materials may be tightly bonded to the pre-formed piece made of the heterogeneous material via the microstructure on the surface of the pre-formed piece to form a transition connection part having a microstructure reinforcing connection structure. Thereafter, the mold are cooled at a rate higher than a critical cooling rate of the amorphous alloy material to ensure that the amorphous alloy material remains substantially amorphous, so as to obtain a composite made of the amorphous alloy material and the heterogeneous material. Finally, the die-casting mold is opened to remove the composite.

It should be noted that when the transition connection part having a fusion welded structure is formed by the die casting process, it is only required that the casting temperature of the amorphous alloy material is higher than the melting temperature of the heterogeneous material, but it is not required that a microstructure is formed on the surface of the pre-formed piece made of the heterogeneous material, otherwise the microstructure may be destroyed.

Hot Pressing

The pre-formed piece made of the heterogeneous material and formed with a microstructure on a surface thereof is placed in a hot pressing chamber of a hot pressing mold of a hot press and fixed onto the hot pressing mold. Then, the amorphous alloy material is placed in the hot pressing chamber, heated to a temperature not lower than the glass transition temperature, and pressed under a predetermined shaping pressure at a certain rate into a predetermined shape. The amorphous alloy material may be joined to the pre-formed piece under the pressure. Accordingly, the amorphous alloy material is tightly filled in the microstructure to form the microstructure reinforcing connection structure, that is, to form the transition connection part 103 having the microstructure reinforcing connection structure. Due to the excellent flowability of the molten amorphous alloy material, the amorphous alloy materials may be tightly bonded to the pre-formed piece made of the heterogeneous material via the microstructure under the directly applied thermal pressure. Thereafter, the mold are cooled at a rate higher than a critical cooling rate of the amorphous alloy material to ensure that the amorphous alloy material remains substantially amorphous, so as to obtain a composite made of the amorphous alloy material and the heterogeneous material. Finally, the hot pressing mold is opened to remove the composite. The hot pressing is performed mainly by using the superplastic rheology or semisolid flow of a material, and in some embodiments, the hot pressing is performed mainly by using the semisolid flow of the amorphous alloy material due to the supercooled liquid phase region thereof, so that in the hot pressing, the casting temperature of the amorphous alloy material is higher than the glass transition temperature $T_g$ of the amorphous alloy material, but lower than the melting temperature of the amorphous alloy material.

It should be noted that other casting processes, for example, injection casting or insert molding, may also be used to join the amorphous alloy material to the heterogeneous material via the microstructure. Therefore, the die casting and the hot pressing are illustrated for exemplary purpose rather than limitation.

The method of joining the amorphous alloy material to the heterogeneous material according to a fourth embodiment of the present disclosure will be described below with reference to FIG. 4.

As shown in FIG. 4, first, a pre-formed piece made of the amorphous alloy material is provided, and a microstructure is formed on a surface of the pre-formed piece. The pre-formed piece is placed in a mold. Then, the heterogeneous material is heated to a temperature not lower than a melting temperature of the heterogeneous material, and cast into the mold to form a transition connection part joining the amorphous alloy material to the heterogeneous material. Finally, the mold are cooled at a rate higher than a critical cooling rate of the amorphous alloy material to obtain a composite formed by joining the amorphous alloy material to the heterogeneous material by the transition connection part.

In some embodiments, a casting temperature of the heterogeneous material is lower than a glass transition temperature of the amorphous alloy material, so that the transition connection part between the amorphous alloy material and the heterogeneous material may have a microstructure reinforcing connection structure formed by the heterogeneous material and the microstructure on the surface of the pre-formed piece. By forming the microstructure reinforcing connection structure, the bonding strength between the amorphous alloy material and the heterogeneous material may be enhanced.

Because the casting temperature of the heterogeneous material is lower than the glass transition temperature of the amorphous alloy material, the melt of the heterogeneous material may not destroy the microstructure on the surface of the pre-formed piece, so that the microstructure reinforcing connection structure may be formed by the heterogeneous material and the microstructure on the surface of the pre-formed piece to enhance the bonding strength between the amorphous alloy material and the heterogeneous material.

Other aspects of the method of joining the amorphous alloy material to the heterogeneous material according to the fourth embodiment of the present disclosure may be the same as those of the method of joining the amorphous alloy material to the heterogeneous material according to the third embodiment of the present disclosure, so a detailed description thereof will be omitted here.

The method of joining the amorphous alloy material to the heterogeneous material according to a fifth embodiment of the present disclosure will be described below with reference to FIG. 5.

Figure 5:
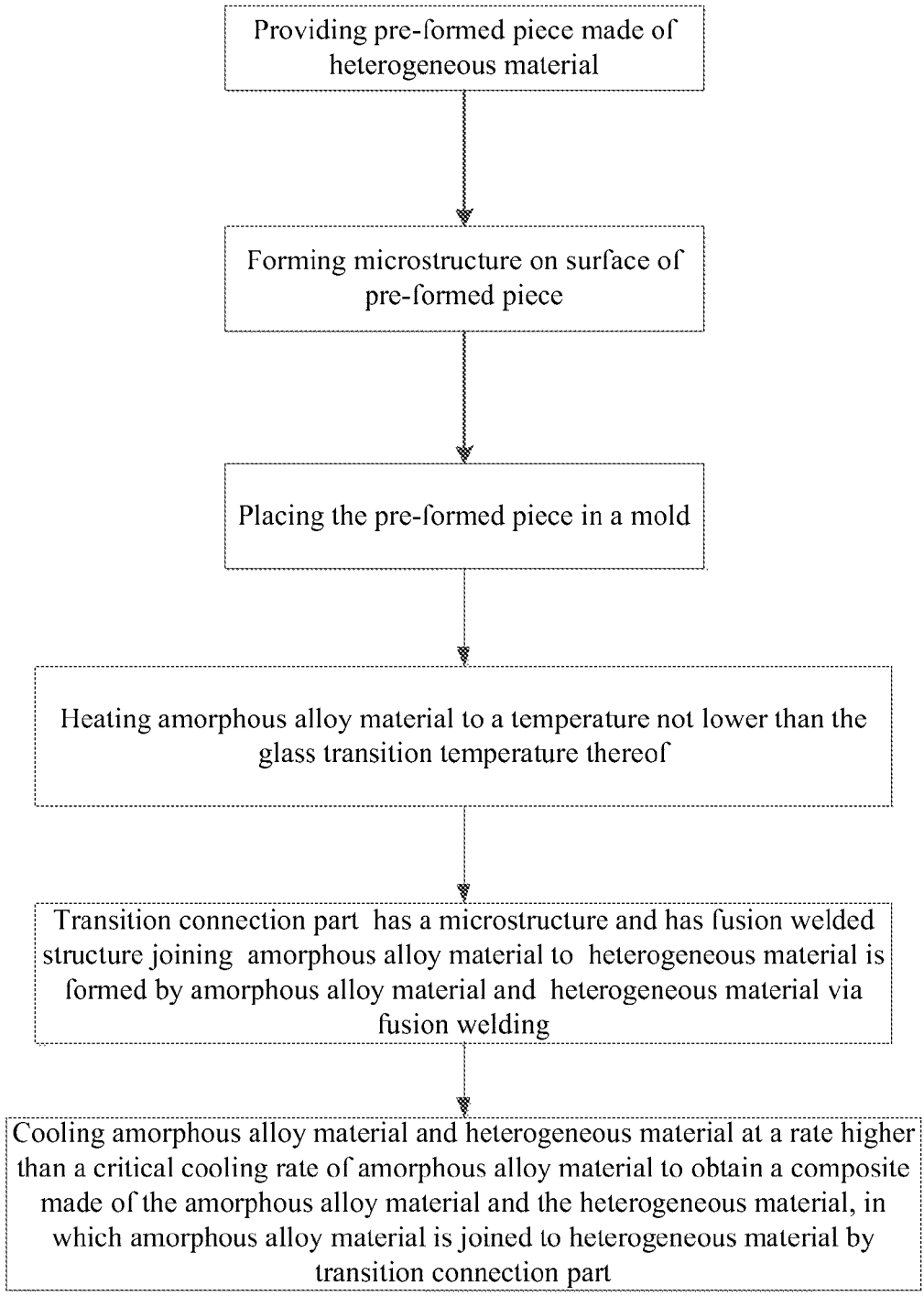
FIG. 5 is a flow chart of a method of joining an amorphous alloy material to a heterogeneous material according to a fifth embodiment of the present disclosure.

As shown in FIG. 5, first, a pre-formed piece made of the heterogeneous material is provided, and a microstructure is formed on a surface of the pre-formed piece. The pre-formed piece is placed in a mold. Then, the amorphous alloy material is heated to a temperature not lower than a glass transition temperature of the amorphous alloy material, advantageously, a temperature not lower than a melting temperature of the amorphous alloy material, and cast into the mold to form a transition connection part joining the amorphous alloy material to the heterogeneous material. Finally, the mold are cooled at a rate higher than a critical cooling rate of the amorphous alloy material to obtain a composite made of the amorphous alloy material and the heterogeneous material.

In some embodiments, a casting temperature of the amorphous alloy material in a first partial region of the mold is lower than a melting temperature of the heterogeneous material, so that the transition connection part between the amorphous alloy material and the heterogeneous material may have a microstructure reinforcing connection structure formed by the amorphous alloy material and the microstructure on the surface of the pre-formed piece. By forming the microstructure reinforcing connection structure, the bonding strength between the amorphous alloy material and the heterogeneous material may be enhanced. In some embodiments, a casting temperature of the amorphous alloy material in a second partial region of the mold is higher than the melting temperature of the heterogeneous material by a predetermined value, and consequently the melt of the amorphous alloy material may destroy the microstructure on the surface of the pre-formed piece, so that the transition connection part having a fusion welded structure may be formed by the amorphous alloy material and the heterogeneous material via fusion welding.

In other words, the transition connection part between the amorphous alloy material and the heterogeneous material has a microstructure reinforcing connection structure and a fusion welded structure, which may be referred to as a composite connection structure.

In this embodiment, the transition connection part between the amorphous alloy material and the heterogeneous material has a microstructure reinforcing connection structure and a fusion welded structure, thus further enhancing the bonding strength between the amorphous alloy material and the heterogeneous material.

In an alternative embodiment, the pre-formed piece may be made of the amorphous alloy material, and the heterogeneous material is heated to a temperature not lower than a melting temperature of the heterogeneous material and cast into the mold, in which a casting temperature of the heterogeneous material in a first partial region of the mold is lower than a glass transition temperature of the amorphous alloy material, and a casting temperature of the heterogeneous material in a second partial region of the mold is higher than the glass transition temperature of the amorphous alloy material by a predetermined value. In this embodiment, the transition connection part between the amorphous alloy material and the heterogeneous material may also have a composite connection structure.

Examples of the present disclosure will be described below.

Example 1

Amorphous alloy components were mixed according to a proportion shown in Table 1 and melted to obtain an ingot of a Zr-based amorphous alloy, which was called an amorphous alloy for short in the following. As determined by DSC (differential scanning calorimetry) analysis, the glass transition temperature and the melting temperature of the amorphous alloy were 420° C. and 835° C. respectively. It was proven by X-ray diffraction that the amorphous alloy was completely amorphous. A stainless steel, a magnesium alloy, an aluminum alloy, a zinc alloy, and the amorphous alloy were made into pre-formed pieces 12 shown in FIG. 12 respectively. The materials of the pre-formed pieces 12 were shown in Table 1. Each pre-formed piece 12 had a section size of 1.1 mm×4.1 mm and a length of 80 mm. Meanwhile, a stainless steel and the amorphous alloy were made into workpieces with a size of 2 mm×6 mm×100 mm respectively as comparative examples. Microstructures were formed on the surfaces of the pre-formed pieces 12 made of the stainless steel, the magnesium alloy, and the aluminum alloy by shot blasting respectively. After the microstructures were formed, the roughness Ra of the surface of each pre-formed piece 12 was 100 μm. Then, the pre-formed pieces 12 made of the stainless steel, the magnesium alloy, the aluminum alloy, and the zinc alloy were placed in a die-casting mold and fixed onto the die-casting mold respectively, the amorphous alloy was heated to a temperature near a melting temperature thereof, and the melt of the amorphous alloy was cast into the die-casting mold and joined to each pre-formed piece 12. As determined by the thermocouple test, the casting temperature of the amorphous alloy was lower than 600° C. The die-casting mold was cooled using a mold temperature oil at a rate higher than the critical cooling rate of the Amorphous alloy. After cooled, the die-casting mold was opened to obtain a composite workpiece shown in FIG. 12. An outer portion 11 made of the amorphous alloy wrapped up each pre-formed piece 12 uniformly. Meanwhile, an amorphous alloy workpiece without the pre-formed piece was obtained, as shown by the comparative example in Table 1.

Figure 12:
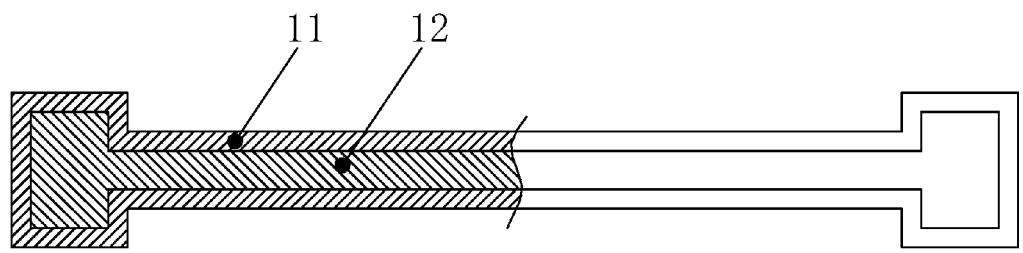
FIG. 12 is a schematic view of a testing piece formed by joining an amorphous alloy material to a heterogeneous material according to an embodiment of the present disclosure.

In addition, the amorphous alloy was made into a pre-formed piece which was placed in a mold, the zinc alloy was heated to a temperature which is not lower than the melting temperature of the zinc alloy and not lower than the glass transition temperature Tg of the amorphous alloy, the melt of the zinc alloy was cast into the mold and joined to the pre-formed piece, and the mold was cooled and opened to obtain a composite workpiece shown in FIG. 12. Meanwhile, a pre-formed piece made of the amorphous alloy was placed in an injection mold, the PE plastic was heated to a temperature not lower than the melting temperature thereof, the melt of the PE plastic was cast into the injection mold and joined to the pre-formed piece, and the injection mold was cooled and opened to obtain a composite workpiece shown in FIG. 12. For the workpiece having a microstructure reinforcing connection structure which is made of the amorphous alloy and the stainless steel, a metallographic sample of the transition connection part of the workpiece was prepared, and observed by scanning electron microscopy to obtain a scanning electron micrograph shown in FIG. 10. For the pre-formed piece made of the zinc alloy, the scanning electron micrograph of a fusion welded structure formed by the amorphous alloy and the zinc alloy was shown in FIG. 9. It may be seen from FIGS. 9-10 that a transition connection part having a microstructure reinforcing connection structure and a transition connection part having a fusion welded structure were obtained respectively.

After the composite workpieces were manufactured, free-drop strength testing was performed for the obtained 100 workpieces, and the test results were shown in Table 1. It may be seen from Table 1 that, due to the brittleness of the amorphous alloy, 90% of the workpieces merely made of the amorphous alloy breaks under the impact of 2.4 joules of energy; due to low strength and good plastic deformation of the stainless steel, 100% of the workpieces merely made of the stainless steel are bent; however, there are cracks on only a part of the workpieces made of the amorphous alloy and the heterogeneous material according to an embodiment of the present disclosure, and the integrity of the article reaches 100%, thus ensuring high strength and high use safety of the composite workpieces.

TABLE 1

Performance of composite workpieces formed by joining the amorphous alloy to heterogeneous material by different ways

| Material | Amorphous alloy (comparative example) | Stainless steel (comparative example) | Amorphous alloy (outer) + Stainless steel (inner) | Amorphous alloy (outer) + Aluminum alloy (inner) | Amorphous alloy (outer) + Magnesium alloy (inner) | Amorphous alloy (outer) + Zinc alloy (inner) | Zinc alloy (outer) Amorphous alloy (inner) | Plastic (outer) Amorphous alloy (inner) |
|---|---|---|---|---|---|---|---|---|
| Material of pre-formed piece | None | Stainless steel 304 | Stainless steel 304 | Aluminum alloy 6061 | Magnesium alloy AZ91D | Zinc alloy ZA8 | $Zr_{52.5}Al_{10}Cu_{30}Ni_7Y_{0.5}$ | PE |
| Melting temperature of pre-formed piece (° C.) | None | 1440 | 1440 | 620 | 600 | 385 | 835 | 135 |
| Joining way | None | None | Microstructure reinforcing | Microstructure reinforcing | Microstructure reinforcing | Partial fusion welding | Microstructure reinforcing | Microstructure reinforcing |
| Number of droping workpieces (PCS) | 100 | 100 | 100 | 100 | 100 | 100 | 100 | 100 |
| Impact energy (Joule) | 2.4 | 2.4 | 2.4 | 2.4 | 2.4 | 2.4 | 2.4 | 2.4 |
| Free-drop Broken | 80 | 0 | 0 | 0 | 0 | 0 | 0 | 0 |
| Cracks | 10 | 0 | 20 | 10 | 0 | 0 | 0 | 0 |
| Bent | 0 | 100 | 0 | 0 | 0 | 0 | 0 | 0 |
| Intact | 10 | 0 | 80 | 90 | 100 | 100 | 100 | 100 |

Note
1. Drop condition: free drop from 20 meters;
2. A workpiece collided with an aluminum oxide ceramic surface;
3. The heterogeneous material was uniformly coated with the amorphous alloy, the section size of the pre-formed piece made of the heterogeneous material was 1.1 mm × 4.1 mm, the section size of each composite was 2 × 6 mm;
4. The amorphous alloy used was represented by a general formula: $Zr_{52.5}Al_{10}Cu_{30}Ni_7Y_{0.5}$ (atomic percent), the amorphous alloy had a $T_g$ of 420° C. and a $T_m$ of 835° C.

Example 2

Amorphous alloy components were mixed according to a proportion shown in Table 2 and melted to obtain an ingot of a Zr-based amorphous alloy, which was called an amorphous alloy for short in the following. As determined by DSC analysis, the glass transition temperature and the melting temperature of the amorphous alloy were 420° C. and 835° C. respectively. It was proven by X-ray diffraction that the amorphous alloy was completely amorphous. A stainless steel, a magnesium alloy, an aluminum alloy, a zinc alloy, and the amorphous alloy were made into pre-formed pieces 12 shown in FIG. 12 respectively. The materials of the pre-formed pieces 12 were shown in Table 2. Each pre-formed piece 12 had a section size of 1.1 mm×4.1 mm and a length of 80 mm.

Meanwhile, the amorphous alloy was made into a workpiece with a size of 2 mm×6 mm×100 mm as a comparative example. Microstructures were formed on the surfaces of the pre-formed pieces 12 made of the stainless steel, the magnesium alloy, the aluminum alloy and the amorphous alloy by shot blasting using steel shots with different particle sizes respectively. The Microstructures were shown in Table 2. Then, the pre-formed pieces 12 made of the stainless steel, the magnesium alloy, the aluminum alloy, and the zinc alloy were placed in a die-casting mold and fixed onto the die-casting mold respectively, the amorphous alloy was heated to a temperature near a melting temperature thereof, and the melt of the amorphous alloy was cast into the die-casting mold and joined to each pre-formed piece 12. As determined by the thermocouple test, the casting temperature of the amorphous alloy was lower than 600° C. The die-casting mold was cooled using a mold temperature oil at a rate higher than the critical cooling rate of the Amorphous alloy. After cooled, the die-casting mold was opened to obtain a composite workpiece shown in FIG. 12. An outer portion 11 made of the amorphous alloy wrapped up each pre-formed piece 12 uniformly. Meanwhile, an amorphous alloy workpiece without the pre-formed piece was obtained, as shown by the comparative example in Table 2. Meanwhile, a workpiece made of the stainless steel without a microstructure was placed in a mold and joined to the amorphous alloy to obtain a workpiece as a comparative example.

In addition, a pre-formed piece made of the amorphous alloy was placed in an injection mold, the PE plastic was heated to a temperature not lower than the melting temperature thereof, the melt of the PE plastic was cast into the injection mold and joined to the pre-formed piece, and the injection mold was cooled and opened to obtain a composite workpiece shown in FIG. 12, in which the outer portion was made of a heterogeneous material, i.e., the PE plastic, and the inner portion was the pre-formed piece made of the amorphous alloy.

Figure 13:
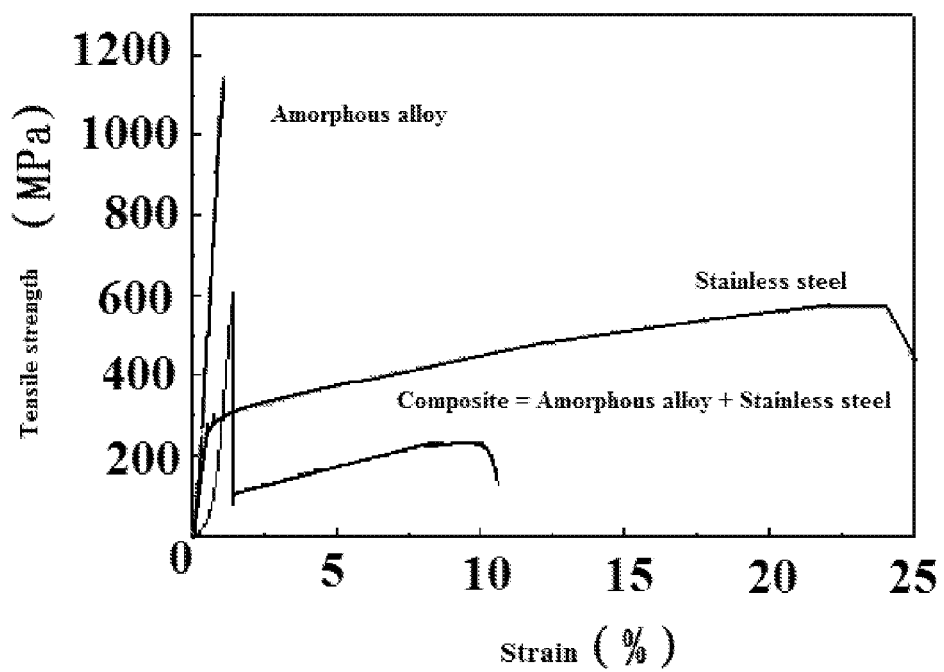
FIG. 13 is a comparison diagram of stress-strain curves of a composite, an amorphous alloy material and a conventional material according to an embodiment of the present disclosure.

After the composite workpieces were manufactured, the bonding strength and the impact toughness of the obtained workpieces were tested respectively. The bonding strength of the workpieces was determined by tensile tests on a universal mechanical testing machine. The toughness of the workpieces was obtained by Izod unnotched impact tests. The test results were shown in Table 2. In addition, the tensile curves of the amorphous alloy, the composite made of the amorphous alloy and the stainless steel, and the stainless steel were shown in FIG. 13.

It may be seen from Table 2 that, compared with conventional physical joining ways, the bonding strength (for example, the microstructure reinforcing connection structure and/or the fusion welded structure) between the amorphous alloy material and the heterogeneous material according to an embodiment of the present disclosure may be enhanced significantly; and although the bonding strength between the amorphous alloy material and the heterogeneous material according to an embodiment of the present disclosure is lower than the strength of the amorphous alloy material, the impact toughness of the composite according to an embodiment of the present disclosure are enhanced significantly, and the bonding strength between the amorphous alloy material and the heterogeneous material according to an embodiment of the present disclosure is higher than the bonding strength between a conventional amorphous alloy and the stainless steel. It may be seen from FIG. 13 that: (1) the deformation of the amorphous alloy is merely elastic deformation throughout the tensile process, and although the amorphous alloy exhibits high tensile strength, the amorphous alloy will break suddenly once the ultimate strength thereof is exceeded; (2) the stainless steel exhibits excellent plastic deformation, but exhibits low strength; and (3) for the composite made of the amorphous alloy and the stainless steel, because of the introduction of the stainless steel, during the tensile process, the composite breaks twice, i.e., brittle fracture produced by the amorphous alloy and plastic fracture produced by the stainless steel, and the entire composite has good plastic deformation, thus making up for the destroy of the brittleness of the brittle fracture of the amorphous alloy to the composite. Meanwhile, the fracture strength of the composite according to an embodiment of the present disclosure when the composite breaks for the first time is also higher than that of the stainless steel, and the entire composite exhibits plastic deformation possessed by a conventional material, thus avoiding brittle fracture of the amorphous alloy. Therefore, the bonding performance between the amorphous alloy material and the heterogeneous material according to an embodiment of the present disclosure may be enhanced significantly, and the use safety of the composite may be improved significantly.

Meanwhile, when the amorphous alloy material wraps up the heterogeneous material or is partially joined to the heterogeneous material, high hardness, excellent wear resistance and corrosion resistance of the amorphous alloy material may be brought into play, and the use amount of the amorphous alloy material may be saved, thus saving the cost.

When the heterogeneous material wraps up the amorphous alloy material or is partially joined to the amorphous alloy material, low strength of the heterogeneous material may be compensated for, however, high plastic deformation and large impact toughness of the heterogeneous material may be brought into play, as shown by the example where the plastic is joined to the amorphous alloy in Table 2.

TABLE 2

Comparison of data of the bonding strength and the impact toughness of composite workpieces formed by joining the amorphous alloy to heterogenous material by different ways

| Material | Amorphous alloy (comparative example) | Amorphous alloy + Stainless steel (comparative example) | Amorphous alloy + Stainless steel | Amorphous alloy + Stainless steel | Amorphous alloy + Magnesium alloy | Amorphous alloy + Aluminum alloy | Amorphous alloy + Zinc alloy | Plastic + Amorphous alloy |
|---|---|---|---|---|---|---|---|---|
| Material of pre-formed piece | None | Stainless steel 304 | Stainless steel 304 | Stainless steel 304 | Magnesium alloy AZ91D | Aluminum alloy 6061 | Zinc alloy ZA8 | Amorphous alloy |
| Surface state of pre-formed piece | None | Ra = 0.05 μm | Ra = 200 μm | Feature size 2000 μm | Feature size 1000 μm | Feature size 1000 μm | Ra = 0.05 μm | Ra = 200 μm |

TABLE 2-continued

Comparison of data of the bonding strength and the impact toughness of composite workpieces formed by joining the amorphous alloy to heterogenous material by different ways

| Material | Amorphous alloy (comparative example) | Amorphous alloy + Stainless steel (comparative example) | Amorphous alloy + Stainless steel | Amorphous alloy + Stainless steel | Amorphous alloy + Magnesium alloy | Amorphous alloy + Aluminum alloy | Amorphous alloy + Zinc alloy | Plastic + Amorphous alloy |
|---|---|---|---|---|---|---|---|---|
| Joining way | None | Normal physical joining | Microstructure reinforcing | Microstructure reinforcing | Microstructure reinforcing | Microstructure reinforcing | Fusion welding | Microstructure reinforcing |
| Bonding strength (MPa) | 1150 | 400 | 600 | 650 | 550 | 500 | 550 | 520 |
| Impact toughness (KJ/m$^2$) | 200 | 2000 | 4000 | 4200 | 800 | 1200 | 700 | 1500 |

Note
The heterogeneous material was uniformly coated with the amorphous alloy, the section size of the pre-formed piece made of the heterogeneous material was 1.1 mm × 4.1 mm, the section size of each composite was 2 × 6 mm;
The impact way was Izod unnotched impact;
The amorphous alloy used was represented by a general formula of $Zr_{52.5}Al_{10}Cu_{30}Ni_7Y_{0.5}$ (atomic percent).

Example 3

Data of the performance of the composite workpieces which were formed by the amorphous alloy to a heterogeneous material via fusion welding and which are not formed by fusion welding the amorphous alloy to a heterogeneous material were listed in Table 3. The composition, the melting temperature and the glass transition temperature of the amorphous alloy, the casting temperature of the melt of the amorphous alloy, the surface state of each pre-formed piece, the melting temperature and the casting temperature of the heterogeneous material, and the joining ways were all listed in Table 3. The bonding performance data of the composites formed by joining the amorphous alloy to a heterogeneous material were also listed in Table 3. The methods of joining the amorphous alloy to a heterogeneous material were the same as those in Example 1.

It may be seen from Table 3 that, the bonding strength and the impact toughness of the composites formed by the amorphous alloy to the heterogeneous material via fusion welding according to an embodiment of the present disclosure are significantly higher than those of the composites in the comparative examples, in which the bonding strength and the impact toughness of a part of the composites may be 2 times or more as high as those of the composites formed by a conventional physical joining way, thus enhancing the strength and the safety of the composite largely.

Therefore, the composite formed by the method of joining the amorphous alloy material to the heterogeneous material according to an embodiment of the present disclosure may have high strength and high use safety, thus enhancing the safety performance of the article largely. Meanwhile, high strength may be beneficial for the miniaturization of the article.

TABLE 3

Comparison of data of the bonding strength and the impact toughness of composite workpieces which are formed by the amorphous alloy to a heterogeneous material via fusion welding and which are not formed by fusion welding the amorphous alloy to a heterogeneous material

| Material | Amorphous alloy (outer) + Zinc alloy (inner) | Amorphous alloy (outer) + Zinc alloy (inner) | Amorphous alloy (outer) + Zinc alloy (inner) | Amorphous alloy (outer) + Copper alloy (inner) | Amorphous alloy (outer) + Copper alloy (inner) | Zinc alloy (outer) + Amorphous alloy (inner) | Zinc alloy (outer) + Amorphous alloy (inner) |
|---|---|---|---|---|---|---|---|
| Material of pre-formed piece | Zinc alloy ZA8 | Zinc alloy ZA8 | Zinc alloy ZA8 | High lead tin bronze alloy (C937) | High lead tin bronze alloy (C937) | Zinc alloy ZA8 | Zinc alloy ZA8 |
| Surface state of pre-formed piece | Ra = 0.05 | Ra = 0.05 | Ra = 0.05 | Ra = 0.05 | Ra = 0.05 | Ra = 0.05 | Ra = 0.05 |
| Melting temperature of heterogeneous material (° C.) | 375 | 375 | 375 | 762 | 762 | 835 | 835 |
| Casting temperature (° C.) | 430 (comparative example) | 460 | 650 | 810 (comparative example) | 900 | 450 | 500 |
| Joining way | Normal physical joining | Partial fusion welding | Fusion welding | Normal physical joining | Fusion welding | Normal physical joining | Fusion welding |
| Bonding strength (MPa) | 250 | 450 | 550 | 350 | 650 | 200 | 400 |

TABLE 3-continued

Comparison of data of the bonding strength and the impact toughness of composite workpieces which are formed by the amorphous alloy to a heterogeneous material via fusion welding and which are not formed by fusion welding the amorphous alloy to a heterogeneous material

| Material | Amorphous alloy (outer) + Zinc alloy (inner) | Amorphous alloy (outer) + Zinc alloy (inner) | Amorphous alloy (outer) + Zinc alloy (inner) | Amorphous alloy (outer) + Copper alloy (inner) | Amorphous alloy (outer) + Copper alloy (inner) | Zinc alloy (outer) + Amorphous alloy (inner) | Zinc alloy (outer) + Amorphous alloy (inner) |
|---|---|---|---|---|---|---|---|
| Impact toughness (KJ/m$^2$) | 350 | 600 | 700 | 450 | 900 | 340 | 600 |

Note
The amorphous alloy used was represented by a general formula of $Zr_{52.5}Al_{10}Cu_{30}Ni_7Y_{0.5}$ (atomic percent), and the amorphous alloy had a $T_g$ of 420° C. and a $T_m$ of 835° C.

Example 4

Data of the performance of the composite workpieces formed by joining different amorphous alloys to the heterogeneous material, i.e., a stainless steel, were listed in Table 4. The composition of each amorphous alloy, the content of the crystalline phase in each amorphous alloy, the critical size of each amorphous alloy, the elastic limit of each amorphous alloy, the surface state of each pre-formed piece, and the joining ways were listed in Table 4 in detail. The bonding performance data of the composites formed by joining two amorphous alloys, i.e., an amorphous alloy and a heterogeneous amorphous alloy, were also listed in Table 4. The methods of joining the amorphous alloys to the heterogeneous material were the same as those in Example 1.

It may be seen from Table 4 that, the bonding strength and the impact toughness of the composite formed by joining the amorphous alloy material to the heterogeneous material according to an embodiment of the present disclosure are significantly higher than those of the composites in the comparative examples, the composites formed by joining different amorphous alloys with a critical size larger than 1 mm and an elastic limit larger than 0.5% to the stainless steel may all have high strength and high toughness, and the composite having high strength may also be obtained by joining the amorphous alloy to a heterogeneous amorphous alloy. It may also be seen from Table 4 that, the bonding strength and the impact toughness of the composite formed by joining the amorphous alloy having a crystalline phase to the stainless steel are also higher than those of the composites in the comparative examples.

Therefore, the method of joining the amorphous alloy material to the heterogeneous material and the composite formed by the same according to an embodiment of the present disclosure may have wide applicability, thus supplying technical conditions to the application of the amorphous alloy material and the reduction of the cost.

TABLE 4

Comparison of data of the bonding strength and the impact toughness of composite workpieces formed by joining different amorphous alloys to the heterogeneous material

| Material | Amorphous alloy + Stainless steel (comparative example) | Amorphous alloy + Stainless steel | Amorphous alloy + Stainless steel | Amorphous alloy + Stainless steel | Amorphous alloy + Stainless steel | Amorphous alloy + Heterogeneous amorphous alloy |
|---|---|---|---|---|---|---|
| Amorphous alloy | Zr-based amorphous alloy | Zr-based amorphous alloy | Zr-based amorphous alloy | Zr-based amorphous alloy | Fe-based amorphous alloy | Zr-based amorphous alloy |
| General formula of amorphous alloy | $Zr_{71}Al_8Ni_{21}$ | $Zr_{50}Al_{10}Cu_{30}Ni_{10}$ | $Zr_{52.5}Al_{10}Cu_{30}Ni_7Y_{0.5}$ | $Zr_{66}Al_6Cu_9Ni_{19}$ | $Fe_{41}Co_7Cr_{15}Mo_{14}C_{15}B_6Y_2$ | $Zr_{52.5}Al_{10}Cu_{30}Ni_7Y_{0.5}$ |
| Content of crystalline phase (%) | 20 | 0 | 0 | 20 | 5 | 0 |
| Critical size of amorphous alloy (mm) | 0.8 | 3 | 8 | 8 | 4 | 8 |
| Elastic limit of amorphous alloy (%) | 0.4 | 1 | 2 | 0.8 | 1.4 | 2 |
| Material of pre-formed piece | Stainless steel 304 | Stainless steel 304 | Stainless steel 304 | Stainless steel 304 | Stainless steel 304 | Heterogeneous amorphous alloy ($Zr_{65}Cu_{15}Al_8Ni_{12}$) |
| Surface state of pre-formed piece | Ra = 200 μm | Ra = 200 μm | Ra = 200 μm | Ra = 200 μm | Ra = 200 μm | Ra = 200 μm |

TABLE 4-continued

Comparison of data of the bonding strength and the impact toughness of composite workpieces formed by joining different amorphous alloys to the heterogeneous material

| Material | Amorphous alloy + Stainless steel (comparative example) | Amorphous alloy + Stainless steel | Amorphous alloy + Stainless steel | Amorphous alloy + Stainless steel | Amorphous alloy + Stainless steel | Amorphous alloy + Heterogeneous amorphous alloy |
|---|---|---|---|---|---|---|
| Joining way | Microstructure reinforcing | Microstructure reinforcing | Microstructure reinforcing | Microstructure reinforcing | Microstructure reinforcing | Microstructure reinforcing |
| Bonding strength (MPa) | 200 | 550 | 600 | 500 | 700 | 1000 |
| Impact toughness (KJ/m$^2$) | 1000 | 3000 | 4000 | 2500 | 4500 | 800 |

Note
The heterogeneous material was uniformly coated with the amorphous alloy, the section size of the pre-formed piece made of the heterogeneous material was 1.1 mm × 4.1 mm, the section size of each composite was 2 × 6 mm;
The impact way was Izod unnotched impact;
The chemical compositions of the amorphous alloy were in atomic percents.

Example 5

Figure 14:
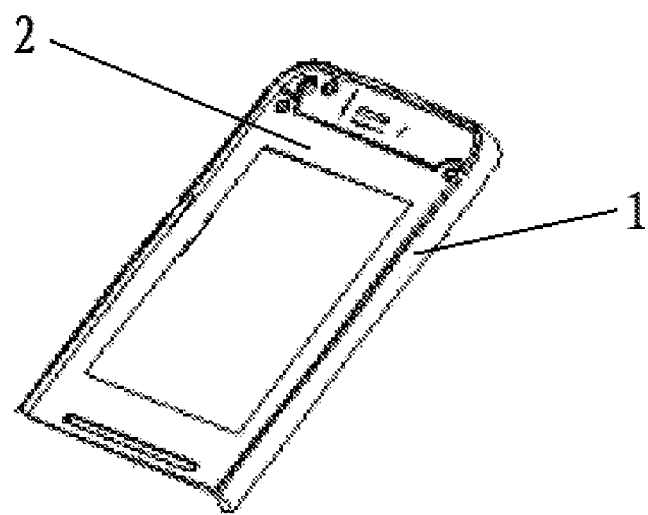
FIG. 14 is a perspective view of a shell for a mobile phone made of an amorphous alloy material and a heterogeneous material according to an embodiment of the present disclosure.
Figure 15:
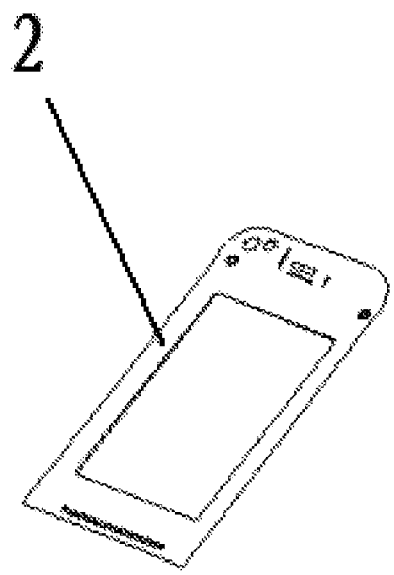
FIG. 15 is a perspective view of a pre-formed piece made of an amorphous alloy material in the shell for the mobile phone shown in FIG. 14.

FIG. 14 is a perspective view of a shell for a mobile phone made of an amorphous alloy material and a heterogeneous material according to an embodiment of the present disclosure. The shell for the mobile phone comprises a stainless steel sheet stamped structure 2 to be connected other members, as shown in FIG. 15. The stainless steel sheet stamped structure 2 is formed with various functional structures thereon, for example, a screw thread or a functional hole. The stainless steel sheet stamped structure 2 has a wall thickness of 0.1 mm. After the stainless steel sheet stamped structure 2 is formed by stamping and tiny screw thread structures are obtained by machining the stainless steel sheet stamped structure 2, a surface of the stainless steel sheet stamped structure 2 is treated by shot blasting to obtain a microstructure with a roughness Ra of 200 micrometers. Then, the stainless steel sheet stamped structure 2 is placed into a die-casting mold and positioned, a melt of an amorphous alloy represented by a general formula of $Zr_{66}Al_6Cu_9Ni_{19}$ is cast into the die-casting mold at a casting temperature which is higher than the melting temperature of the amorphous alloy and lower than the melting temperature of the stainless steel, and the amorphous alloy is joined to the stainless steel to obtain a frame portion 1, so as to obtain an article, i.e., the shell for the mobile phone, shown in FIG. 14.

A surface of the frame portion 1 is polished and decorated, and then the shell for the mobile phone is assembled with other members for the mobile phone to form the mobile phone. The obtained mobile phone has performances of wear resistance and corrosion resistance, and may pass the rigorous drop test for a mobile phone. Therefore, the composite made of the amorphous alloy and the stainless steel according to an embodiment of the present disclosure may protect functional members inside the mobile phone, and the mobile phone may have high safety and high reliability. Meanwhile, the pre-implantation of the stainless steel sheet stamped structure 2 with a thickness of 0.1 mm may reduce the amount of the amorphous alloy, reduce the forming difficulty of the amorphous alloy, enhance the production yield, and reduce the production cost of the composite, which reflects the significant advantages of the method of joining the amorphous alloy material to the heterogeneous material and the composite formed by the same according to an embodiment of the present disclosure.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments can not be construed to limit the present disclosure, and changes, alternatives, and modifications can be made in the embodiments without departing from spirit, principles and scope of the present disclosure.

What is claimed is:

1. A method of joining an amorphous alloy material to a heterogeneous material, comprising steps of:
    placing a first pre-formed piece made of one material selected from the group consisting of the amorphous alloy material and the heterogeneous material into a mold;
    heating a second piece made of one material selected from the group consisting of the amorphous alloy material and the heterogeneous material to a predetermined temperature to form a melt, wherein the first pre-formed piece and the second piece are made of different material;
    casting the melt into the mold to form a transition connection part, the transition connection part joining the amorphous alloy material to the heterogeneous material and having one of a fusion welded structure, a microstructure reinforcing connection structure and a composite connection structure, in which the fusion welded structure is formed by the amorphous alloy material and the heterogeneous material via fusion welding, the microstructure reinforcing connection structure is formed by a microstructure on a surface of the pre-formed piece and the other of the amorphous alloy material and the heterogeneous material, and the composite connection structure comprises the fusion welded structure and the microstructure reinforcing connection structure; and cooling the amorphous alloy material and the heterogeneous material at a rate higher than a critical cooling rate of the amorphous alloy material to obtain a composite formed by the amorphous alloy material to the heterogeneous material joined via the transition connection part, wherein the first pre-formed piece is made of the heterogeneous material, and the amorphous alloy material is heated to a temperature not lower than a glass transition temperature thereof and cast into the mold, in which a casting temperature of the amorphous alloy material in a first region of the mold is lower than a melting temperature of the heterogeneous material, and a casting temperature of the amorphous alloy material in a second region of the mold is higher than the melting temperature of the heterogeneous material by a predetermined value.

2. The method according to claim 1, wherein the amorphous alloy material is a bulk amorphous alloy material with a critical size larger than about 1 mm and has an elastic limit of about 0.5% or greater; and wherein the amorphous alloy material contains crystalline substances or is doped with inorganic substances.

3. The method according to claim 1, wherein the amorphous alloy material is selected from the group consisting of a Fe-based amorphous alloy, a Zr-based amorphous alloy, a Cu-based amorphous alloy, a Ti-based amorphous alloy, and a Ni-based amorphous alloy; and wherein the heterogeneous material is selected from the group consisting of a steel, an aluminum alloy, a magnesium alloy, a nickel alloy, a copper alloy, a titanium alloy, a zinc alloy, a plastic material, ceramics, glass, a heterogeneous bulk amorphous alloy, and any combination thereof.

4. The method according to claim 1, wherein the amorphous alloy material is heated to a temperature not lower than a melting temperature thereof.

5. The method according to claim 1, wherein the predetermined temperature is not less than about 15% of the melting temperature of the heterogeneous material.

6. The method according to claim 1, wherein a microstructure is formed on at least a portion of a surface of the first pre-formed piece joined to the second piece of the amorphous alloy material and the heterogeneous material, the transition connection part has the microstructure reinforcing connection structure, and the microstructure reinforcing connection structure is formed by the microstructure and the other of the amorphous alloy material and the heterogeneous material.

7. The method according to claim 6, wherein the microstructure is at least one of a hole, a closed or semi-closed honeycomb structure, and a surface structure with a roughness between about 1 μm and about 250 μm.

8. The method according to claim 7, wherein a minimum three-dimensional feature size of the hole and/or the honeycomb structure is about 1 μm to about 3000 μm.

* * * * *